United States Patent
Dumbuya et al.

(10) Patent No.: US 12,005,426 B2
(45) Date of Patent: Jun. 11, 2024

(54) THREE-WAY CONVERSION CATALYST IN GASOLINE-NATURAL GAS APPLICATIONS

(71) Applicant: BASF Corporation, Florham Park, NJ (US)

(72) Inventors: Karifala Dumbuya, Hannover (DE); Thomas Schmitz, Hannover (DE); Florian Waltz, Hannover (DE); Stephan Siemund, Hannover (DE)

(73) Assignee: BASF Corporation, Florham Park, NJ (US)

( * ) Notice: Subject to any disclaimer, the term of this patent is extended or adjusted under 35 U.S.C. 154(b) by 645 days.

(21) Appl. No.: 17/250,794

(22) PCT Filed: Sep. 12, 2019

(86) PCT No.: PCT/EP2019/074395
§ 371 (c)(1),
(2) Date: Mar. 4, 2021

(87) PCT Pub. No.: WO2020/053350
PCT Pub. Date: Mar. 19, 2020

(65) Prior Publication Data
US 2021/0339228 A1   Nov. 4, 2021

(30) Foreign Application Priority Data
Sep. 13, 2018   (EP) .................... 18194263

(51) Int. Cl.
*B01J 21/04*   (2006.01)
*B01J 21/06*   (2006.01)
(Continued)

(52) U.S. Cl.
CPC .......... *B01J 23/6562* (2013.01); *B01J 21/04* (2013.01); *B01J 37/0244* (2013.01); *F01N 3/035* (2013.01);
(Continued)

(58) Field of Classification Search
CPC ........ B01J 21/04; B01J 21/063; B01J 21/066; B01J 21/08; B01J 21/12; B01J 23/10;
(Continued)

(56) References Cited

U.S. PATENT DOCUMENTS

| 3,867,309 A | 2/1975 | Oleck et al. |
| 4,678,770 A * | 7/1987 | Wan ..................... B01D 53/945 502/302 |

(Continued)

FOREIGN PATENT DOCUMENTS

| CN | 108136373 A | 6/2018 |
| GB | 995 598 A | 6/1965 |

(Continued)

OTHER PUBLICATIONS

International Search Report dated Dec. 5, 2019 for International Application No. PCT/EP2019/074395.
(Continued)

*Primary Examiner* — Cam N. Nguyen
(74) *Attorney, Agent, or Firm* — DLA Piper LLP (US)

(57) ABSTRACT

The disclosure relates to a three-way conversion catalyst for the treatment of an exhaust gas comprising nitrogen monoxide, carbon monoxide, and hydrocarbon, wherein the catalyst comprises: (i) a substrate; (ii) a first coating comprising rhodium supported on a first oxidic component; (iii) a second coating comprising palladium supported on a non-zeolitic oxidic material, wherein the non-zeolitic oxidic material comprises manganese and a second oxidic component, wherein the second coating consists of 0 weight-% to 0.001 weight-% of platinum; wherein the first coating is disposed on the substrate over x % of the axial length, with x ranging from 80 to 100; wherein the second coating
(Continued)

extends over y % of the axial length from the inlet end to the outlet end and is disposed on the first coating, with y ranging from 20 to x.

15 Claims, 3 Drawing Sheets

(51) Int. Cl.
| | |
|---|---|
| B01J 21/08 | (2006.01) |
| B01J 21/12 | (2006.01) |
| B01J 23/10 | (2006.01) |
| B01J 23/34 | (2006.01) |
| B01J 23/42 | (2006.01) |
| B01J 23/44 | (2006.01) |
| B01J 23/46 | (2006.01) |
| B01J 23/63 | (2006.01) |
| B01J 23/656 | (2006.01) |
| B01J 37/02 | (2006.01) |
| F01N 3/035 | (2006.01) |
| F01N 3/10 | (2006.01) |
| F01N 3/08 | (2006.01) |

(52) U.S. Cl.
CPC ............ *F01N 3/101* (2013.01); *F01N 3/0835* (2013.01); *F01N 3/0842* (2013.01); *F01N 3/0857* (2013.01)

(58) Field of Classification Search
CPC ... B01J 23/34; B01J 23/42; B01J 23/44; B01J 23/464; B01J 23/63; B01J 23/6562; B01J 37/0244; F01N 3/035; F01N 3/101
USPC ........ 502/258–262, 304, 324, 332–334, 339, 502/349–351, 355, 415, 439, 527.12, 502/527.13
See application file for complete search history.

(56) References Cited

U.S. PATENT DOCUMENTS

| | | | | |
|---|---|---|---|---|
| 7,517,510 B2* | 4/2009 | Chen | ................... | B01J 37/0244 422/177 |
| 7,550,124 B2* | 6/2009 | Chen | ................... | F01N 13/0097 422/177 |
| 7,754,171 B2* | 7/2010 | Chen | ................... | B01J 37/0244 60/302 |
| 7,758,834 B2* | 7/2010 | Chen | ................... | F01N 13/0097 60/299 |
| 7,922,988 B2* | 4/2011 | Deeba | ................ | B01D 53/9472 422/177 |
| 8,007,750 B2* | 8/2011 | Chen | ................... | B01D 53/945 502/262 |
| 8,580,706 B2* | 11/2013 | Matsueda | ............ | B01J 37/0244 502/355 |
| 8,950,174 B2* | 2/2015 | Hilgendorff | ........... | B01J 35/023 60/299 |
| 9,034,269 B2* | 5/2015 | Hilgendorff | ......... | B01J 37/0246 502/262 |
| 9,242,242 B2* | 1/2016 | Hilgendorff | ......... | B01J 37/0248 |
| 9,266,092 B2* | 2/2016 | Arnold | ................ | B01J 37/0248 |
| 9,636,634 B2* | 5/2017 | Chiffey | ................ | B01J 37/0036 |
| 9,849,423 B2* | 12/2017 | Chiffey | .................... | B01J 23/58 |
| 10,328,388 B2* | 6/2019 | Dumbuya | ............ | B01J 37/0244 |
| 10,335,776 B2* | 7/2019 | Sung | ........................ | B01J 23/96 |
| 10,512,898 B2* | 12/2019 | Deeba | .................. | B01J 35/0006 |
| 10,695,752 B2* | 6/2020 | Misumi | ................ | B01J 35/0073 |
| 10,821,401 B2* | 11/2020 | Chiffey | .................. | B01D 53/56 |
| 10,828,623 B2* | 11/2020 | Nunan | ................. | F01N 3/2803 |
| 10,857,521 B2* | 12/2020 | Sung | ........................ | B01J 29/22 |
| 10,864,502 B2* | 12/2020 | Sung | .................... | B01J 37/0246 |
| 10,974,228 B2* | 4/2021 | Chandler | ............. | B01J 37/0248 |
| 11,248,505 B2* | 2/2022 | Sung | ........................ | B01J 23/02 |
| 11,260,372 B2* | 3/2022 | Xue | ...................... | F01N 3/2828 |
| 11,311,865 B2* | 4/2022 | Sung | .................... | B01J 37/0246 |
| 11,471,863 B2* | 10/2022 | Sung | ......................... | F01N 3/20 |
| 2008/0044330 A1* | 2/2008 | Chen | .................... | B01J 37/0248 502/333 |
| 2008/0219906 A1* | 9/2008 | Chen | .................... | B01J 37/0244 502/262 |
| 2009/0041643 A1* | 2/2009 | Deeba | .................. | B01D 53/945 422/168 |
| 2009/0041645 A1* | 2/2009 | Wassermann | .......... | B01J 21/066 422/180 |
| 2009/0175773 A1* | 7/2009 | Chen | .................... | B01J 20/3021 422/177 |
| 2011/0094211 A1 | 4/2011 | Kikuchi et al. | | |
| 2012/0180464 A1 | 7/2012 | Wei et al. | | |
| 2015/0165422 A1 | 6/2015 | Sung et al. | | |
| 2015/0165423 A1 | 6/2015 | Sung et al. | | |
| 2015/0202572 A1 | 7/2015 | Chiffey et al. | | |
| 2015/0202600 A1 | 7/2015 | Chiffey et al. | | |
| 2015/0202611 A1 | 7/2015 | Chiffey et al. | | |
| 2019/0240643 A1* | 8/2019 | Karpov | .................... | B01J 23/44 |
| 2020/0347763 A1* | 11/2020 | Liu | ........................ | B01J 23/464 |

FOREIGN PATENT DOCUMENTS

| | | |
|---|---|---|
| JP | H10-192713 A | 7/1998 |
| JP | 2017-501031 A | 1/2017 |
| WO | 2010/001765 A1 | 1/2010 |
| WO | 2015/09058 A1 | 1/2015 |

OTHER PUBLICATIONS

Decision to Grant a Patent dated Aug. 8, 2023, of counterpart Japanese Patent Application No. 2021-514348, along with an English translation.

First Office Action dated Feb. 3, 2023, of counterpart Chinese Patent Application No. 201980059595.9, along with an English machine translation.

Hu et al; Design of a novel Pd three-way catalyst: Integration of catalytic functions in three dimensions, Catalysis Today, vol. 30, Issues 1-3, Jun. 17, 1996, pp. 83-89.

* cited by examiner

THREE-WAY CONVERSION CATALYST IN GASOLINE-NATURAL GAS APPLICATIONS

This application is a U.S. national phase entry application under 35 U.S.C. § 371 from PCT International Application No. PCT/EP2019/074395, filed Sep. 12, 2019, which claims priority to European Patent Application No. 18194263.2, filed Sep. 13, 2018; the contents of each application is incorporated herein by reference in its entirety.

The present application relates to a three-way conversion catalyst for the treatment of an exhaust gas comprising NO, CO and HC and to a process for preparing said catalyst. The present invention further relates to a three-way conversion catalyst obtained or obtainable by said process, to an exhaust gas treatment system comprising the three-way conversion catalyst of the present invention and to a use of said three-way conversion catalyst.

WO 2015/09058 A1 discloses an oxidation catalyst composite for the treatment of exhaust gas emissions from a diesel engine which is effective to abate hydrocarbon (HC) and carbon oxide (CO) and to oxidize nitrogen monoxide (NO). Said composite comprises different washcoat layers on a substrate, each layer comprising platinum group metals, preferably platinum, support materials and/or a zeolitic material. US 2015/202572 A1 also describes an oxidation catalyst for the treatment of exhaust gas emissions from a diesel engine which is effective to abate hydrocarbon and carbon oxide and to oxidize nitrogen monoxide; the catalyst comprises different washcoat layers on a substrate, platinum group metals, preferably platinum, support materials and/or a zeolitic material. Further, US 2015/202600 A1 and US2015/202611 A1 disclose the same kind of oxidation catalysts for the treatment of exhaust gas emissions from a diesel engine.

With current discussions on the future of diesel combustion engines, combinations of gasoline and compressed natural gas modes in one car (gasoline-natural gas hybrid vehicles) are particularly of interest. The hydrocarbon emissions of compressed natural gas engines are composed predominantly of methane, which is difficult to combust over conventional catalysts and when it is the case, this requires high precious metal loadings (100-200 g/ft$^3$), particularly of palladium. Given that global precious metal supply may not be unlimited; there is a need for the automotive business to develop new catalysts, such as three-way conversion catalysts or oxidation catalysts, which have competitive performance at lower platinum group metal loadings which is good for a sustainable platinum group metal supply in particular and the environment in general.

Therefore, it was an object of the present invention to provide a three-way conversion catalyst for treating an exhaust gas comprising HC, CO and NO from a gasoline engine and/or a combined gasoline-natural gas engine which exhibits improved catalytic activities, such as improved HC conversion, CO conversion and NOx conversion. Surprisingly, it was found that the three-way conversion catalyst for the treatment of an exhaust gas comprising HC, CO and NO according to the present invention permits to achieve improved catalytic activities, such as improved HC conversion, CO conversion and NOx conversion.

Therefore, the present invention relates to a three-way conversion catalyst for the treatment of an exhaust gas comprising NO, CO and HC, the catalyst comprising:
(i) a substrate comprising an inlet end, an outlet end, a substrate axial length extending from the inlet end to the outlet end and a plurality of passages defined by internal walls of the substrate extending therethrough;
(ii) a first coating comprising rhodium supported on a first oxidic component;
(iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;

wherein the first coating is disposed on the surface of the internal walls of the substrate over x % of the substrate axial length, with x being in the range of from 80 to 100;
wherein the second coating extends over y % of the substrate axial length from the inlet end to the outlet end and is disposed on the first coating, with y being in the range of from 20 to x.

As to x, it is preferred that it is in the range of from 90 to 100, more preferably in the range of from 95 to 100, more preferably in the range of from 98 to 100, more preferably in the range of from 99 to 100.

As to y, it is preferred that it is in the range of from 30 to 80, more preferably in the range of from 40 to 60, more preferably in the range of from 45 to 55. It is more preferred that x is in the range of from 99 to 100 and y is in the range of from 45 to 55.

Alternatively, it is preferred that y is in the range of from 70 to x, more preferably in the range of from 80 to x, more preferably in the range of from 90 to x, more preferably wherein y is x. It is more preferred that x is in the range of from 99 to 100 and y is x.

As to the loading of rhodium comprised in the first coating, there is no particular restriction. It is preferred that the first coating comprises rhodium, calculated as elemental rhodium, at a loading in the range of from 2 to 100 g/ft$^3$, more preferably in the range of from 3 to 70 g/ft$^3$, more preferably in the range of from 4 to 30 g/ft$^3$.

Preferably, the first oxidic component comprised in the first coating is selected from the group consisting of alumina, ceria, silica, zirconia, titania, a mixture of two or more thereof and a mixed oxide of two or more thereof, more preferably selected from the group consisting of alumina, titania, zirconia, a mixture of two or more thereof and a mixed oxide of two or more thereof, more preferably selected from the group consisting of alumina, zirconia, a mixture of two thereof, and a mixed oxide of two thereof. The first oxidic component comprised in the first coating is more preferably alumina.

As to the composition of the first coating, there is no particular restriction provided that it comprises rhodium supported on a first oxidic component. It is preferred that the first coating further comprises a platinum group metal other than rhodium, wherein the platinum group metal other than rhodium is more preferably selected from the group consisting of platinum, osmium, palladium, iridium, and a mixture of two or more thereof, more preferably selected from the group consisting of platinum, osmium, palladium, and a mixture of two or more thereof, more preferably selected from the group consisting of platinum, palladium and a mixture of two thereof, more preferably palladium.

It is more preferred that the first coating comprises the platinum group metal other than rhodium, more preferably palladium, calculated as elemental platinum group metal, at a loading, in the range of from 2 to 100 g/ft$^3$, more preferably in the range of from 30 to 80 g/ft$^3$, more preferably in the range of from 40 to 60 g/ft$^3$, more preferably in the range of from 45 to 55 g/ft$^3$.

It is more preferred that the first coating comprises the platinum group metal other than rhodium, calculated as elemental platinum group metal, at a loading, (l1), and rhodium, calculated as elemental rhodium, at a loading, (l2), wherein the loading ratio of (l1):(l2) is in the range of from 1:1 to 10:1, more preferably in the range of from 2:1 to 8:1, more preferably in the range of from 4:1 to 7:1, more preferably in the range of from 5:1 to 6:1.

Therefore, the present invention preferably relates to a three-way conversion catalyst for the treatment of an exhaust gas comprising NO, CO and HC, the catalyst comprising:
(i) a substrate comprising an inlet end, an outlet end, a substrate axial length extending from the inlet end to the outlet end and a plurality of passages defined by internal walls of the substrate extending therethrough;
(ii) a first coating comprising rhodium supported on a first oxidic component, the first oxidic component being selected from the group consisting of alumina, zirconia, a mixture of two thereof, and a mixed oxide of two thereof, more preferably alumina;
(iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;
wherein the first coating further comprises palladium; wherein the first coating comprises palladium, calculated as elemental palladium, at a loading, (l1), and rhodium, calculated as elemental rhodium, at a loading, (l2), wherein the loading ratio of (l1):(l2) is in the range of from 1:1 to 10:1, more preferably in the range of from 2:1 to 8:1, more preferably in the range of from 4:1 to 7:1, more preferably in the range of from 5:1 to 6:1;
wherein the first coating is disposed on the surface of the internal walls of the substrate over x % of the substrate axial length, with x being in the range of from 80 to 100, more preferably in the range of from 90 to 100;
wherein the second coating extends over y % of the substrate axial length from the inlet end to the outlet end and is disposed on the first coating, with y being in the range of from 20 to x, more preferably in the range of from 80 to x.

In the context of the present invention, it is preferred that the platinum group metal other than rhodium is supported on a third oxidic component. The third oxidic component is more preferably selected from the group consisting of alumina, silica, ceria, zirconia, titania, a mixture of two or more thereof and a mixed oxide of two or more thereof, more preferably selected from the group consisting of alumina, zirconia, titania, a mixture of two or more thereof and a mixed oxide of two or more thereof, more preferably selected from the group consisting of alumina, zirconia, a mixture of two thereof, and a mixed oxide of two thereof. The third oxidic component supporting the platinum group metal other than rhodium comprised in the first coating is more preferably alumina.

As to the platinum group metal other than rhodium, it is more preferred that it is further supported on a first oxygen storage compound. The first oxygen storage compound more preferably comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium, lanthanum, and praseodymium. It is more preferred that the platinum group metal other than rhodium is further supported on a first oxygen storage compound which comprises, preferably consists of, a mixed oxide comprising cerium and additionally one or more of zirconium, yttrium and lanthanum.

It is more preferred that the first oxygen compound comprises a mixed oxide comprising cerium, zirconium, yttrium and lanthanum; wherein more preferably from 95 to 100 weight-%, more preferably from 98 to 100 weight-%, more preferably from 99 to 100 weight-%, more preferably from 99.5 to 100 weight-% of the first oxygen storage compound consist of a mixed oxide comprising cerium, zirconium, yttrium and lanthanum; wherein more preferably from 10 to 70 weight-%, more preferably from 20 to 50 weight-%, more preferably from 25 to 40 weight-%, of the first oxygen storage compound consist of cerium, calculated as $CeO_2$, and more preferably from 20 to 80 weight-%, more preferably from 30 to 75 weight-%, more preferably from 50 to 70 weight-%, of the first oxygen storage compound consist of zirconium, calculated as $ZrO_2$.

As to the first oxygen storage compound, it is preferred that the first coating comprises said first oxygen storage compound at a loading in the range of from 0.3 to 5 $g/in^3$, more preferably in the range of from 0.4 to 2 $g/in^3$, more preferably in the range of from 0.5 to 1.5 $g/in^3$, more preferably in the range of from 0.5 to 1.0 $g/in^3$.

Preferably from 95 to 100 weight-%, more preferably from 98 to 100 weight-%, more preferably from 99 to 100 weight-%, more preferably from 99.5 to 100 weight-%, of the platinum group metal other than rhodium comprised in the first coating is supported on the third oxidic component and on the first oxygen storage compound; wherein more preferably from 5 to 70 weight-%, more preferably from 10 to 50 weight-%, more preferably from 20 to 40 weight-%, of the platinum group metal other than rhodium comprised in the first coating is supported on the third oxidic component and more preferably from 30 to 95 weight-%, more preferably from 50 to 90 weight-%, more preferably from 60 to 80 weight-%, of the platinum group metal other than rhodium comprised in the first coating is supported on the first oxygen storage compound.

Therefore, the present invention preferably relates to a three-way conversion catalyst for the treatment of an exhaust gas comprising NO, CO and HC, the catalyst comprising:
(i) a substrate comprising an inlet end, an outlet end, a substrate axial length extending from the inlet end to the outlet end and a plurality of passages defined by internal walls of the substrate extending therethrough;
(ii) a first coating comprising rhodium supported on a first oxidic component, the first oxidic component being selected from the group consisting of alumina, zirconia, a mixture of two thereof, and a mixed oxide of two thereof, more preferably alumina;
(iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;
wherein the first coating further comprises palladium; wherein palladium is supported on a third oxidic component and supported on a first oxygen storage compound;
wherein the first coating is disposed on the surface of the internal walls of the substrate over x % of the substrate axial length, with x being in the range of from 80 to 100, more preferably in the range of from 90 to 100;

wherein the second coating extends over y % of the substrate axial length from the inlet end to the outlet end and is disposed on the first coating, with y being in the range of from 20 to x, more preferably in the range of from 80 to x.

In the context of the present invention, it is preferred that the first coating comprises the first oxidic component, and more preferably a third oxidic component as defined in the foregoing, at a loading in the range of from 0.3 to 8 g/in$^3$, more preferably in the range of from 0.5 to 4 g/in$^3$, more preferably in the range of from 0.7 to 1.5 g/in$^3$.

It is preferred that the first coating further comprises a promoter, the promoter comprising one or more of a barium oxide, a zirconium oxide, a strontium oxide, and a lanthanum oxide, more preferably one or more of a barium oxide and a zirconium oxide. The promoter more preferably comprises, more preferably consists of, a barium oxide and a zirconium oxide. It is more preferred that the catalyst more preferably comprises the promoter at a loading in the range of from 0.02 to 0.2 g/in$^3$, more preferably in the range of from 0.05 to 0.12 g/in$^3$.

It is preferred that the three-way conversion catalyst comprises the first coating at a loading in the range of from 0.5 to 10 g/in$^3$, more preferably in the range of from 0.75 to 5 g/in$^3$, more preferably in the range of from 1 to 3 g/in$^3$, more preferably in the range of from 1.25 to 2.5 g/in$^3$.

Preferably from 95 to 100 weight-%, more preferably from 98 to 100 weight-%, more preferably from 99 to 100 weight-% of the first coating consist of rhodium on the first oxidic component, more preferably on alumina, the platinum group metal other than rhodium supported on the third oxidic component, more preferably on alumina, the platinum group metal other than rhodium supported on the first oxygen storage compound, and more preferably a promotor as defined in the foregoing. It is more preferred that the first coating consist of rhodium on the first oxidic component, more preferably on alumina, the platinum group metal other than rhodium supported on the third oxidic component, more preferably on alumina, the platinum group metal other than rhodium supported on the first oxygen storage compound, and more preferably a promotor as defined in the foregoing.

Preferably from 0 to 0.001 weight-%, more preferably from 0 to 0.0001 weight-%, more preferably from 0.00001 weight-%, of the first coating consist of manganese.

Preferably from 0 to 0.001 weight-%, more preferably from 0 to 0.0001 weight-%, more preferably from 0.00001 weight-%, of the first coating consist of one or more of a zeolitic material and a vanadium containing compound, more preferably a zeolitic material and a vanadium containing compound.

As to the second coating, it is preferred that the manganese comprised in the non-zeolitic oxidic material of the second coating is present as an oxide of manganese, more preferably as manganese dioxide (MnO$_2$), wherein manganese dioxide is more preferably supported on the second oxidic component.

It is preferred that the second coating comprises in the range of from 1 to 10 weight-%, more preferably in the range of from 2 to 9 weight-%, more preferably in the range of from 4 to 9 weight-%, of manganese, calculated as MnO$_2$, based on the weight of the non-zeolitic oxidic material.

It is preferred that the second oxidic component comprised in the non-zeolitic oxidic material of the second coating is selected from the group consisting of alumina, silica, ceria, zirconia, titania, a mixture of two or more thereof, and a mixed oxide of two or more thereof, more preferably selected from the group consisting of alumina, ceria, titania, a mixture of two or more thereof, and a mixed oxide of two or more thereof, more preferably selected from the group consisting of alumina, ceria, a mixture of two thereof, and a mixed oxide of two thereof. It is more preferred that the second oxidic component comprised in the non-zeolitic oxidic material of the second coating is alumina.

Preferably from 98 to 100 weight-%, more preferably from 99 to 100 weight-%, more preferably from 99.5 to 100 weight-% of the non-zeolitic oxidic material consist of manganese, calculated as MnO$_2$, and the second oxidic component.

Therefore, the present invention preferably relates to a three-way conversion catalyst for the treatment of an exhaust gas comprising NO, CO and HC, the catalyst comprising:

(i) a substrate comprising an inlet end, an outlet end, a substrate axial length extending from the inlet end to the outlet end and a plurality of passages defined by internal walls of the substrate extending therethrough;

(ii) a first coating comprising rhodium supported on a first oxidic component, the first oxidic component being selected from the group consisting of alumina, zirconia, a mixture of two thereof, and a mixed oxide of two thereof, more preferably alumina;

(iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;

wherein the first coating further comprises palladium; wherein palladium is supported on a third oxidic component and supported on a first oxygen storage compound;

wherein the second coating comprises in the range of from 1 to 10 weight-%, more preferably in the range of from 2 to 9 weight-%, more preferably in the range of from 4 to 9 weight-%, of manganese, calculated as MnO$_2$, based on the weight of the non-zeolitic oxidic material;

wherein the second oxidic component is selected from the group consisting of alumina, ceria, a mixture of two thereof, and a mixed oxide of two thereof, more preferably alumina; wherein more preferably from 98 to 100 weight-%, more preferably from 99 to 100 weight-%, more preferably from 99.5 to 100 weight-% of the non-zeolitic oxidic material consist of manganese, calculated as MnO$_2$, and the second oxidic component;

wherein the first coating is disposed on the surface of the internal walls of the substrate over x % of the substrate axial length, with x being in the range of from 80 to 100, more preferably in the range of from 90 to 100;

wherein the second coating extends over y % of the substrate axial length from the inlet end to the outlet end and is disposed on the first coating, with y being in the range of from 20 to x, more preferably in the range of from 80 to x.

In the context of the present invention, it is preferred that the second coating comprises the non-zeolitic oxidic material at a loading in the range of from 0.3 to 5 g/in$^3$, more preferably in the range of from 0.4 to 2 g/in$^3$, more preferably in the range of from 0.4 to 1.5 g/in$^3$, more preferably in the range of from 0.4 to 1.0 g/in$^3$.

It is preferred that the second coating comprises palladium, calculated as elemental palladium, at a loading in the range of from 20 to 200 g/ft$^3$, more preferably in the range of from 30 to 150 g/ft$^3$, more preferably in the range of from 50 to 120 g/ft$^3$, more preferably in the range of from 50 to 80 g/ft$^3$.

As to the second coating, it is preferred that it further comprises a second oxygen storage compound, wherein the second oxygen storage compound more preferably comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium, lanthanum, and praseodymium. It is more preferred that the second coating further comprises a second oxygen storage compound which comprises, more preferably consists of, a mixed oxide comprising cerium and additionally one or more of zirconium, yttrium and lanthanum.

As to the second oxygen storage compound, it is preferred that it comprises a mixed oxide comprising cerium, zirconium, yttrium and lanthanum; wherein more preferably from 95 to 100 weight-%, more preferably from 98 to 100 weight-%, more preferably from 99 to 100 weight-%, more preferably from 99.5 to 100 weight-% of the second oxygen storage compound consist of a mixed oxide comprising cerium, zirconium, yttrium and lanthanum. As to the second oxygen storage compound, it is more preferred that from 10 to 70 weight-%, more preferably from 20 to 50 weight-%, more preferably from 25 to 40 weight-%, of the second oxygen storage compound consist of cerium, calculated as $CeO_2$, and that from 20 to 80 weight-%, more preferably from 30 to 75 weight-%, more preferably from 50 to 70 weight-%, of the second oxygen storage compound consist of zirconium, calculated as $ZrO_2$.

It is preferred that the second coating comprises the second oxygen storage compound at a loading in the range of from 0.3 to 5 g/in$^3$, more preferably in the range of from 0.4 to 3 g/in$^3$, more preferably in the range of from 0.6 to 1.75 g/in$^3$.

Preferably from 95 to 100 weight-%, more preferably from 98 to 100 weight-%, more preferably from 99 to 100 weight-%, more preferably from 99.5 to 100 weight-%, of the palladium comprised in the second coating is supported on the non-zeolitic oxidic material and on the second oxygen storage compound. It is more preferred that from 30 to 70 weight-%, more preferably from 40 to 60 weight-%, more preferably from 45 to 55 weight-%, of the palladium comprised in the second coating is supported on the non-zeolitic oxidic material and that from 30 to 70 weight-%, more preferably from 40 to 60 weight-%, more preferably from 45 to 55 weight-%, of the palladium comprised in the second coating is supported on the second oxygen storage compound.

As to the second coating, it is preferred that it further comprises a promoter, the promoter comprising one or more of a barium oxide, a zirconium oxide, a strontium oxide, and a lanthanum oxide, more preferably one or more of a barium oxide and a zirconium oxide, wherein the promoter more preferably comprises, more preferably consists of, a barium oxide. It is more preferred that the second coating comprises the promoter at a loading in the range of from 0.02 to 0.2 g/in$^3$, more preferably in the range of from 0.05 to 0.18 g/in$^3$.

Preferably from 95 to 100 weight-%, more preferably from 98 to 100 weight-%, more preferably from 99 to 100 weight-% of the second coating consist of palladium supported on the non-zeolitic oxidic material, comprising manganese and the second oxidic component, and palladium supported on the second oxygen storage compound, and more preferably a promoter as defined in the foregoing. It is more preferred that the second coating consist of palladium supported on the non-zeolitic oxidic material, comprising manganese and the second oxidic component, and palladium supported on the second oxygen storage compound, and more preferably a promoter as defined in the foregoing.

Therefore, the present invention preferably relates to a three-way conversion catalyst for the treatment of an exhaust gas comprising NO, CO and HC, the catalyst comprising:
(i) a substrate comprising an inlet end, an outlet end, a substrate axial length extending from the inlet end to the outlet end and a plurality of passages defined by internal walls of the substrate extending therethrough;
(ii) a first coating comprising rhodium supported on a first oxidic component, the first oxidic component being selected from the group consisting of alumina, zirconia, a mixture of two thereof, and a mixed oxide of two thereof, more preferably alumina;
(iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;
wherein the first coating further comprises palladium; wherein palladium is supported on a third oxidic component and supported on a first oxygen storage compound;
wherein the second coating comprises in the range of from 1 to 10 weight-%, more preferably in the range of from 2 to 9 weight-%, more preferably in the range of from 4 to 9 weight-%, of manganese, calculated as $MnO_2$, based on the weight of the non-zeolitic oxidic material;
wherein the second oxidic component is selected from the group consisting of alumina, ceria, a mixture of two thereof, and a mixed oxide of two thereof, more preferably alumina;
wherein the second coating further comprises a second oxygen storage compound; wherein the palladium comprised in the second coating is supported on the non-zeolitic oxidic material and on the second oxygen storage material;
wherein the first coating is disposed on the surface of the internal walls of the substrate over x % of the substrate axial length, with x being in the range of from 80 to 100, more preferably in the range of from 90 to 100;
wherein the second coating extends over y % of the substrate axial length from the inlet end to the outlet end and is disposed on the first coating, with y being in the range of from 20 to x, more preferably in the range of from 80 to x.

In the context of the present invention, it is preferred that from 0 to 0.0001 weight-%, more preferably from 0 to 0.00001 weight-%, of the second coating consists of platinum.

Preferably from 0 to 0.001 weight-%, more preferably from 0 to 0.0001 weight-%, more preferably from 0 to 0.00001 weight-%, of the second coating consist of rhodium, more preferably of rhodium, iridium and osmium.

Preferably from 0 to 0.001 weight-%, more preferably from 0 to 0.0001 weight-%, more preferably from 0 to 0.00001 weight-%, of the second coating consist of a molecular sieve.

As to the first coating and the second coating, it is preferred that the first coating comprises rhodium on a first oxidic component, more preferably alumina, a platinum group metal other than rhodium, more preferably palladium, being supported on a third oxidic component and more preferably additionally being supported on a first oxygen storage compound and that the second coating comprises palladium supported on a non-zeolitic oxidic material, wherein the non-zeolitic oxidic material comprises manganese and a second oxidic component, the second oxidic component being more preferably alumina, and supported on a second oxygen storage material, wherein from 0 to 0.001 weight-% of the second coating consists of platinum. It is more preferred that the second coating comprises in the range of from 1 to 10 weight-%, more preferably in the range of from 2 to 9 weight-%, more preferably in the range of from 4 to 9 weight-%, of manganese, calculated as $MnO_2$, based on the weight of the non-zeolitic oxidic material. It is more preferred that the first coating comprises a promotor as defined in the foregoing. It is more preferred that the second coating comprises a promotor as defined in the foregoing, more preferably a barium oxide.

It is preferred that the catalyst consists of the substrate, the first coating and the second coating.

It is preferred that the catalyst comprises the first coating at a first loading, (L1), and the second coating at a second loading, (L2), wherein the loading ratio of (L1):(L2) is in the range of from 4:1 to 1:4, more preferably in the range of from 3:1 to 1:3, more preferably in the range of from 2:1 to 1:2, more preferably in the range of from 1.5:1 to 1:1.5. It is more preferred that the loading ratio of (L1):(L2) is in the range of from 1.2:1 to 1:1.2.

As to the substrate of the catalyst, it is preferred that it comprises a ceramic or metallic material.

It is more preferred that the substrate of the catalyst comprises, more preferably consists of, a ceramic material, wherein the ceramic material more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite. It is more preferred that the substrate of the catalyst comprises, more preferably consists of, a cordierite.

Alternatively, it is more preferred that the substrate of the catalyst comprises, more preferably consists of, a metallic material, wherein the metallic material more preferably comprises, more preferably consists of, oxygen and one or more of iron, chromium, and aluminum.

In the context of the present invention, it is preferred that the substrate according to (i) is a flowthrough substrate, more preferably a cordierite flow-through substrate.

It is alternatively preferred that the substrate according to (i) is a wall-flow filter substrate, more preferably a cordierite wall-flow filter substrate.

It is preferred that the three-way conversion catalyst of the present invention is a three-way conversion catalyst for the treatment of an exhaust gas comprising NO, CO and HC from one or more of a gasoline engine and a combined gasoline-natural gas engine, more preferably from a combined gasoline-natural gas engine.

The present invention further relates to a process for preparing a three-way conversion catalyst, preferably the three-way conversion catalyst according to the present invention, the process comprising:
(a) providing a substrate comprising an inlet end, an outlet end, a substrate axial length extending from the inlet end to the outlet end and a plurality of passages defined by internal walls of the substrate extending therethrough;
(b) preparing a slurry comprising rhodium, a first oxidic component and water; disposing the slurry on the surface of the internal walls of the substrate over x % of the substrate axial length, from the inlet end to the outlet end of the substrate, or from the outlet end to the inlet end of the substrate, with x being in the range of from 80 to 100; calcining the obtained slurry-treated substrate, obtaining a substrate coated with a first coating;
(c) preparing a slurry comprising water, palladium and a non-zeolitic oxidic material, comprising manganese and a second oxidic component; disposing the slurry on the first coating of the coated substrate obtained in (b) over y % of the substrate axial length from the inlet end to the outlet end of the substrate, with y being in the range of from 20 to x; calcining the obtained slurry-treated substrate, obtaining a substrate coated with a first coating and a second coating, wherein from 0 to 0.001 weight-% of the second coating consist of platinum.

As to (b), it is preferred that it comprises:
(b.1) impregnating the rhodium on the first oxidic component; calcining the rhodium on the first oxidic component, more preferably in a gas atmosphere having a temperature in the range of from 300 to 800° C., more preferably in the range of from 500 to 700° C.;
(b.2) more preferably impregnating a platinum group metal other than rhodium as defined in the foregoing on a third oxidic component as defined in the foregoing; calcining the platinum group metal other than rhodium on the third oxidic component, more preferably in a gas atmosphere having a temperature in the range of from 300 to 800° C., more preferably in the range of from 500 to 700° C.;
(b.3) more preferably impregnating the platinum group metal other than rhodium according to (b.2) on a first oxygen storage compound as defined in the foregoing; calcining the platinum group metal other than rhodium on the first oxygen storage compound, more preferably in a gas atmosphere having a temperature in the range of from 300 to 800° C., more preferably in the range of from 500 to 700° C.; preparing a slurry comprising the obtained calcined platinum group metal other than rhodium on the first oxygen storage compound, water, and more preferably one or more of an alcohol and a promoter as defined in the foregoing; more preferably milling the obtained slurry until the particles of the slurry have a Dv90 in the range of from 1 to 20 micrometers, more preferably in the range of from 3 to 10 micrometers, the Dv90 being determined as in Reference Example 2;
(b.4) mixing the calcined rhodium on the first oxidic component obtained in (b.1), water, more preferably the calcined platinum group metal other than rhodium on the third oxidic component obtained in (b.2), and more preferably one or more of an alcohol and a promoter as defined in the foregoing, obtaining a slurry; more preferably milling the obtained slurry until the particles of the slurry have a Dv90 in the range of from 5 to 30 micrometers, more preferably in the range of from 10 to 20 micrometers, the Dv90 being determined as in Reference Example 2;
(b.5) more preferably admixing the slurry obtained in (b.3) and the slurry obtained in (b.4); more preferably milling the obtained slurry until the particles of the slurry have a Dv90 in the range of from 5 to 30 micrometers, more preferably in the range of from 10 to 15 micrometers, the Dv90 being determined as in Reference Example 2;
(b.6) disposing the slurry obtained in (b.4), more preferably the slurry obtained in (b.5), on the surface of the internal walls of the substrate over x % of the substrate axial length, from the inlet end to the outlet end of the substrate, or from the outlet end to the inlet end of the substrate, with x being in the range of from 80 to 100;
(b.7) optionally drying the obtained slurry-treated substrate obtained in (b.6);
(b.8) calcining the obtained slurry-treated substrate obtained in (b.6), or the dried slurry-treated substrate obtained in (b.7).

As to (b), it is more preferred that it comprises:
(b.1) impregnating the rhodium on the first oxidic component; calcining the rhodium on the first oxidic component, more preferably in a gas atmosphere having a temperature in the range of from 300 to 800° C., more preferably in the range of from 500 to 700° C.;
(b.2) impregnating a platinum group metal other than rhodium as defined in the foregoing on a third oxidic component as defined in the foregoing; calcining the platinum group metal other than rhodium on the third oxidic component, more preferably in a gas atmosphere having a temperature in the range of from 300 to 800° C., more preferably in the range of from 500 to 700° C.;
(b.3) impregnating the platinum group metal other than rhodium according to (b.2) on a first oxygen storage compound as defined in the foregoing; calcining the platinum group metal other than rhodium on the first oxygen storage compound, more preferably in a gas atmosphere having a temperature in the range of from 300 to 800° C., more preferably in the range of from 500 to 700° C.; preparing a slurry comprising the obtained calcined platinum group metal other than rhodium on the first oxygen storage compound, water, and more preferably one or more of an alcohol and a promoter as defined in the foregoing; more preferably milling the obtained slurry until the particles of the slurry have a Dv90 in the range of from 1 to 20 micrometers, more preferably in the range of from 3 to 10 micrometers, the Dv90 being determined as in Reference Example 2;
(b.4) mixing the calcined rhodium on the first oxidic component obtained in (b.1), water, the calcined platinum group metal other than rhodium on the third oxidic component obtained in (b.2), and more preferably one or more of an alcohol and a promoter as defined in the foregoing, obtaining a slurry; more preferably milling the obtained slurry until the particles of the slurry have a Dv90 in the range of from 5 to 30 micrometers, more preferably in the range of from 10 to 20 micrometers, the Dv90 being determined as in Reference Example 2;
(b.5) admixing the slurry obtained in (b.3) and the slurry obtained in (b.4); more preferably milling the obtained slurry until the particles of the slurry have a Dv90 in the range of from 5 to 30 micrometers, more preferably in the range of from 10 to 15 micrometers, the Dv90 being determined as in Reference Example 2;
(b.6) disposing the slurry obtained in (b.5) on the surface of the internal walls of the substrate over x % of the substrate axial length, from the inlet end to the outlet end of the substrate, or from the outlet end to the inlet end of the substrate, with x being in the range of from 80 to 100;
(b.7) optionally drying the obtained slurry-treated substrate obtained in (b.6);
(b.8) calcining the obtained slurry-treated substrate obtained in (b.6), or the dried slurry-treated substrate obtained in (b.7).

It is preferred that the process comprises adjusting the pH of the aqueous phase of the slurry obtained in one or more of (b.3), (b.4) and (b.5), more preferably in (b.3) and (b.4) and (b.5), to a value in the range of from 2 to 7, more preferably in the range of from 3 to 5, more preferably by adding an acid, more preferably a nitric acid.

It is preferred that the alcohol used in one or more of (b.3) and (b.4) is a n-octanol. It is more preferred that the alcohol used in (b.3) and in (b.4) is a n-octanol.

As to (b.7), it is preferred that drying is performed in a gas atmosphere having a temperature in the range of from 90 to 200° C., more preferably in the range of from 130 to 150° C., the gas atmosphere more preferably comprising oxygen.

As to (b.7), it is preferred that drying is performed in a gas atmosphere for a duration in the range of from 10 minutes to 3 hours, more preferably in the range of from 20 to 40 minutes, the gas atmosphere more preferably comprising oxygen.

As to (b.8), it is preferred that calcining is performed in a gas atmosphere having a temperature in the range of from 300 to 900° C., more preferably in the range of from 500 to 700° C., the gas atmosphere more preferably comprising oxygen.

As to (b.8), it is preferred that calcining is performed in a gas atmosphere for a duration in the range of from 1 to 8 hours, more preferably in the range of from 1.5 to 3 hours, the gas atmosphere more preferably comprising oxygen.

As to (c), it is preferred that it comprises
(c.1) impregnating palladium on the non-zeolitic oxidic material comprising manganese and a second oxidic component; calcining the palladium on the non-zeolitic oxidic material, more preferably in a gas atmosphere having a temperature in the range of from 300 to 800° C., more preferably in the range of from 500 to 700° C.;
(c.2) preparing a slurry comprising the calcined palladium on the non-zeolitic material obtained in (c.1), water, and more preferably one or more of an alcohol and a promotor as defined in the foregoing; more preferably milling the obtained slurry until the particles of the slurry have a Dv90 in the range of from 5 to 30 micrometers, more preferably in the range of from 10 to 20 micrometers, the Dv90 being determined as in Reference Example 2;
(c.3) more preferably impregnating palladium on a second oxygen storage compound as defined in in the foregoing; calcining palladium on the second oxygen storage compound, more preferably in a gas atmosphere having a temperature in the range of from 300 to 800° C., more preferably in the range of from 500 to 700° C.; preparing a slurry comprising the obtained calcined palladium on the second oxygen storage compound, water, and more preferably one or more of an alcohol and a promoter as defined in the foregoing; more preferably milling the obtained slurry until the particles of the slurry have a Dv90 in the range of from 1 to 20 micrometers, more preferably in the range of from 3 to 10 micrometers, the Dv90 being determined as in Reference Example 2;
(c.4) more preferably admixing the slurry obtained in (c.2) and the slurry obtained in (c.3);
(c.5) milling the slurry obtained in (c.2), more preferably the slurry obtained in (c.4), until the particles of the slurry have a Dv90 in the range of from 2 to 20 micrometers, the Dv90 being determined as in Reference Example 2;
(c.6) disposing the slurry obtained in (c.5) on the first coating of the coated substrate obtained in (b) over y % of the substrate axial length on the first coating from the inlet end to the outlet end of the substrate, with y being in the range of from 20 to x;

(c.7) optionally drying the obtained slurry-treated substrate obtained in (c.6);

(c.8) calcining the obtained slurry-treated substrate obtained in (c.6), or the dried slurry-treated substrate obtained in (c.7).

As to (c), it is more preferred that it comprises (c.1) impregnating palladium on the non-zeolitic oxidic material comprising manganese and a second oxidic component; calcining the palladium on the non-zeolitic oxidic material, more preferably in a gas atmosphere having a temperature in the range of from 300 to 800° C., more preferably in the range of from 500 to 700° C.;

(c.2) preparing a slurry comprising the calcined palladium on the non-zeolitic material obtained in (c.1), water, and more preferably one or more of an alcohol and a promotor as defined in the foregoing; more preferably milling the obtained slurry until the particles of the slurry have a Dv90 in the range of from 5 to 30 micrometers, more preferably in the range of from 10 to 20 micrometers, the Dv90 being determined as in Reference Example 2;

(c.3) impregnating palladium on a second oxygen storage compound as defined in the foregoing; calcining palladium on the second oxygen storage compound, more preferably in a gas atmosphere having a temperature in the range of from 300 to 800° C., more preferably in the range of from 500 to 700° C.; preparing a slurry comprising the obtained calcined palladium on the second oxygen storage compound, water, and more preferably one or more of an alcohol and a promoter as defined in the foregoing; more preferably milling the obtained slurry until the particles of the slurry have a Dv90 in the range of from 1 to 20 micrometers, more preferably in the range of from 3 to 10 micrometers, the Dv90 being determined as in Reference Example 2;

(c.4) admixing the slurry obtained in (c.2) and the slurry obtained in (c.3);

(c.5) milling the slurry obtained in (c.4) until the particles of the slurry have a Dv90 in the range of from 2 to 20 micrometers, the Dv90 being determined as in Reference Example 2;

(c.6) disposing the slurry obtained in (c.5) on the first coating of the coated substrate obtained in (b) over y % of the substrate axial length on the first coating from the inlet end to the outlet end of the substrate, with y being in the range of from 20 to x;

(c.7) optionally drying the obtained slurry-treated substrate obtained in (c.6);

(c.8) calcining the obtained slurry-treated substrate obtained in (c.6), or the dried slurry-treated substrate obtained in (c.7).

As to milling in one or more of (b) and (c), preferably in (b) and (c), it should be understood by the skilled person that if the particles to be milled in a slurry in said (b) and (c) have already the appropriate Dv90, the different milling processes disclosed in (b) and (c) may be optional.

It is preferred that the process comprises adjusting the pH of the aqueous phase of the slurry obtained in one or more of (c.2), (c.3) and (c.4), more preferably in (c.2) and (c.3) and (c.4), to a value in the range of from 2 to 7, more preferably in the range of from 3 to 5, more preferably by adding an acid, more preferably a nitric acid.

According to (c.5), it is preferred that milling is performed until the particles of the slurry have a Dv90 in the range of from 5 to 18 micrometers, more preferably in the range of from 10 to 15 micrometers.

As to (c.7), it is preferred that drying is performed in a gas atmosphere having a temperature in the range of from 90 to 200° C., more preferably in the range of from 130 to 150° C., the gas atmosphere more preferably comprising oxygen.

As to (c.7), it is preferred that drying is performed in a gas atmosphere for a duration in the range of from 10 minutes to 3 hours, more preferably in the range of from 20 to 40 minutes, the gas atmosphere more preferably comprising oxygen.

As to (c.8), it is preferred that calcining is performed in a gas atmosphere having a temperature in the range of from 300 to 900° C., more preferably in the range of from 500 to 700° C., the gas atmosphere more preferably comprising oxygen.

As to (c.8), it is preferred that calcining is performed in a gas atmosphere for a duration in the range of from 1 to 8 hours, more preferably in the range of from 1.5 to 3 hours, the gas atmosphere more preferably comprising oxygen.

It is preferred that disposing the slurry according to (b) is performed by spraying or immersing the substrate, more preferably by immersing the substrate.

It is preferred that disposing the slurry according to (c) is performed by spraying or immersing the substrate, more preferably by immersing the substrate.

It is preferred that x is in the range of from 90 to 100, more preferably in the range of from 95 to 100, more preferably in the range of from 98 to 100, more preferably in the range of from 99 to 100.

It is preferred that y is in the range of from 30 to 80, more preferably in the range of from 40 to 60, more preferably in the range of from 45 to 55

It is alternatively preferred that y is in the range of from 80 to x, more preferably in the range of from 90 to x, more preferably wherein y is x. It is more preferred that x is in the range of from 99 to 100 and that y is x.

It is preferred that the process of the present invention consists of (a), (b), and (c).

The present invention further relates to a three-way conversion catalyst, preferably the three-way conversion catalyst according to the present invention, obtained or obtainable or preparable or prepared by a process according to the present invention, more preferably wherein the process consists of (a), (b), and (c) as defined in the foregoing.

The present invention further relates to an exhaust gas treatment system downstream of and in fluid communication with an engine, the system comprising a three-way conversion catalyst according to the present invention.

It is preferred that the engine is one or more of a gasoline engine and a combined gasoline-natural gas engine, more preferably a combined gasoline-natural gas engine.

It is preferred that the exhaust gas stream of the engine comprises hydrocarbon (HC), carbon monoxide (CO), and nitrogen oxide (NO).

The present invention further relates to a use of a three-way conversion catalyst according to the present invention for the treatment of an exhaust gas comprising HC, CO and NO, preferably from a gasoline engine, more preferably from a combined gasoline-natural gas engine.

The present invention further relates to a method for the treatment of an exhaust gas comprising HC, CO, and NO, preferably from one or more of a gasoline engine and a combined gasoline-natural gas engine, more preferably a combined gasoline-natural gas engine, the method comprising using a three-way conversion catalyst according to the present invention.

It is preferred that the second coating according to (iii) is the coating (ii) as defined in the following.

Furthermore, it was another object of the present invention to provide a catalyst for treating an exhaust gas comprising HC, CO and NO from a gasoline engine and/or a combined gasoline-natural gas engine which exhibits improved catalytic activities, such as improved HC conversion, CO conversion and NO conversion. Surprisingly, it was found that the catalyst for the treatment of an exhaust gas comprising HC, CO and NO according to the present invention permits to achieve improved catalytic activities, such as improved HC conversion, CO conversion and NO conversion.

Therefore, the present invention further relates to a catalyst for the treatment of an exhaust gas comprising HC, CO and NO, the catalyst comprising:
(i) a substrate comprising an inlet end, an outlet end, a substrate axial length extending from the inlet end to the outlet end and a plurality of passages defined by internal walls of the substrate extending therethrough;
(ii) a coating disposed on the surface of the internal walls of the substrate, wherein the coating comprises palladium supported on a non-zeolitic oxidic material comprising manganese and an oxidic component, the coating further comprising a promotor comprising barium; wherein from 0 to 0.001 weight-% of the coating consists of platinum.

It is preferred that the coating extends over y1% of the substrate axial length from the inlet end to the outlet end of the substrate, or from the outlet end to the inlet of the substrate, with y1 being in the range of from 80 to 100, more preferably in the range of from 90 to 100, more preferably in the range of from 95 to 100, more preferably in the range of from 98 to 100, more preferably in the range of from 99 to 100.

It is preferred that manganese comprised in the non-zeolitic oxidic material of the coating is present as an oxide of manganese, more preferably as manganese dioxide ($MnO_2$), wherein manganese dioxide is more preferably supported on the oxidic component.

It is preferred that the coating comprises in the range of from 1 to 10 weight-%, more preferably in the range of from 2 to 9 weight-%, more preferably in the range of from 4 to 9 weight-%, of manganese, calculated as $MnO_2$, based on the weight of the non-zeolitic oxidic material.

As to the oxidic component comprised in the non-zeolitic oxidic material, it is preferred that it is selected from the group consisting of alumina, ceria, silica, zirconia, titania, a mixture of two or more thereof, and a mixed oxide of two or more thereof, more preferably selected from the group consisting of alumina, ceria, titania, a mixture of two or more thereof, and a mixed oxide of two or more thereof, more preferably selected from the group consisting of alumina, ceria, a mixture of two thereof, and a mixed oxide of two thereof, more preferably alumina.

Preferably from 98 to 100 weight-%, more preferably from 99 to 100 weight-%, more preferably from 99.5 to 100 weight-% of the non-zeolitic oxidic material consist of manganese, calculated as $MnO_2$, and the oxidic component.

It is preferred that the coating comprises palladium, calculated as elemental palladium, at a loading in the range of from 20 to 200 $g/ft^3$, more preferably in the range of from 30 to 150 $g/ft^3$, more preferably in the range of from 50 to 120 $g/ft^3$.

It is preferred that the coating comprises the non-zeolitic oxidic material at a loading in the range of from 0.5 to 4 $g/in^3$, more preferably in the range of from 1 to 3 $g/in^3$, more preferably in the range of from 1 to 1.8 $g/in^3$.

It is preferred that the promoter comprised in the coating comprises, preferably consists of, a barium oxide. It is more preferred that the coating comprises a barium oxide as the promotor, calculated as BaO, at a loading, (Ip), and the non-zeolitic oxidic material at a loading, (In), wherein the loading ratio of (Ip):(In) is in the range of from 0.02:1 to 0.2:1, more preferably in the range of from 0.04:1 to 0.08:1.

As to the promotor, it is preferred that the coating comprises said promoter at a loading in the range of from 0.02 to 0.2 $g/in^3$, more preferably in the range of from 0.05 to 0.1 $g/in^3$.

Preferably from 95 to 100 weight-%, more preferably from 98 to 100 weight-%, more preferably from 99 to 100 weight-% of the coating consist of palladium supported on the non zeoltic oxidic material, comprising manganese and the oxidic component, and the promoter comprising barium. It is preferred that the coating consist of palladium supported on the non zeoltic oxidic material, comprising manganese and the oxidic component, and the promoter comprising barium.

Preferably from 0 to 0.0001 weight-%, more preferably from 0 to 0.00001 weight-%, of the coating consists of platinum.

Preferably from 0 to 0.001 weight-%, more preferably from 0 to 0.0001 weight-%, more preferably from 0 to 0.00001 weight-%, of the coating consist of rhodium, more preferably of rhodium, iridium and osmium.

Preferably from 0 to 0.001 weight-%, more preferably from 0 to 0.0001 weight-%, more preferably from 0 to 0.00001 weight-%, of the coating consist of a molecular sieve.

It is preferred that the catalyst according to the present invention consists of the substrate and the coating.

It is preferred that the substrate according to (i) is a flow-through substrate. It is preferred that the flow-through substrate more preferably comprises, more preferably consists of, a ceramic material, wherein the ceramic material more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite.

Alternatively, it is preferred that the substrate according to (i) is a wall-flow filter substrate. It is preferred that the wall-flow filter substrate more preferably comprises, more preferably consists of, a ceramic material, wherein the ceramic material more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite.

It is preferred that the catalyst is a catalyst for the treatment of an exhaust gas comprising HC, CO and NO from one or more of a gasoline engine and a combined gasoline-natural gas engine, more preferably from a combined gasoline-natural gas engine.

The present invention further relates to a process for preparing a catalyst for the treatment of an exhaust gas comprising HC, CO and NO, preferably the catalyst according to the present invention, the process comprising:
(A) providing a substrate comprising an inlet end, an outlet end, a substrate axial length extending from the inlet end to the outlet end and a plurality of passages defined by internal walls of the substrate extending therethrough;

(B) preparing a catalytic slurry comprising water, palladium, a non-zeolitic oxidic material, comprising manganese and an oxidic component, and a promoter comprising barium;

(C) disposing the slurry obtained in (B) on the surface of the internal walls of the substrate provided in (A); calcining the obtained slurry-treated substrate, obtaining a substrate coated with a coating, wherein from 0 to 0.01 weight-% of the coating consist of platinum.

As to (B), it is preferred that it comprises (B.1) impregnating palladium on the non-zeolitic oxidic material comprising manganese and an oxidic component;

(B.2) calcining the palladium on the non-zeolitic oxidic material obtained in (B.1), more preferably in a gas atmosphere having a temperature in the range of from 300 to 800° C., more preferably in the range of from 500 to 700° C.;

(B.3) preparing a mixture comprising water, a promotor comprising barium, and more preferably an alcohol, more preferably n-octanol;

(B.4) adding the calcined palladium on the non-zeolitic oxidic material obtained in (B.2) to the mixture obtained in (B.3), obtaining an intermediate slurry;

(B.5) more preferably adjusting the pH of the aqueous phase of the intermediate slurry obtained in (B.4) to a value in the range of from 2 to 7, more preferably in the range of from 3 to 5;

(B.6) milling the intermediate slurry obtained in (B.4), more preferably the slurry obtained in (B.5), until the particles of the slurry have a Dv90 in the range of from 2 to 20 micrometers, more preferably in the range of from 10 to 15 micrometers, the Dv90 being determined as in Reference Example 2, obtaining a catalytic slurry.

As to (B.6), it should be understood by the skilled person that, if the particles of the slurry obtained in (B.4) or (B.5) have already a Dv90 in the range of from 2 to 20 micrometers, more preferably in the range of from 10 to 15 micrometers, said milling according to (B.6) may be optional.

As to (C), it is preferred that it comprises (C.1) disposing the catalytic slurry obtained in (B) on the surface of the internal walls of the substrate provided in (A) over y1% of the substrate axial length from the inlet end to the outlet end of the substrate, with y1 being in the range of from 80 to 100, more preferably in the range of from 90 to 100, more preferably in the range of from 95 to 100, more preferably in the range of from 98 to 100, more preferably in the range of from 99 to 100;

(C.2) optionally drying the obtained slurry-treated substrate obtained in (C.1);

(C.3) calcining the obtained slurry-treated substrate obtained in (C.1), or the dried slurry-treated substrate obtained in (C.2);

wherein disposing according (C.1) is performed by spraying or immersing the substrate, more preferably by immersing the substrate.

As to (C.2), it is preferred that drying is performed in a gas atmosphere having a temperature in the range of from 90 to 200° C., more preferably in the range of from 130 to 150° C., the gas atmosphere more preferably comprising oxygen.

As to (C.2), it is preferred that drying is performed in a gas atmosphere for a duration in the range of from 10 minutes to 3 hours, more preferably in the range of from 20 to 40 minutes, the gas atmosphere more preferably comprising oxygen.

As to (C.3), it is preferred that calcining is performed in a gas atmosphere having a temperature in the range of from 300 to 900° C., more preferably in the range of from 500 to 700° C., the gas atmosphere more preferably comprising oxygen.

As to (C.3), it is preferred that calcining is performed in a gas atmosphere for a duration in the range of from 1 to 8 hours, more preferably in the range of from 1.5 to 3 hours, the gas atmosphere more preferably comprising oxygen.

The present invention further relates to a catalyst for the treatment of an exhaust gas comprising HC, CO and NO, preferably the catalyst according to the present invention, obtainable or obtained or preparable or prepared by a process according to the present invention.

The present invention further relates to a use of a catalyst according to the present invention for the treatment of an exhaust gas comprising HC, CO and NO, preferably from one or more of a gasoline engine and a combined gasoline-natural gas engine, more preferably from a combined gasoline-natural gas engine.

The present invention further relates to a method for the treatment of an exhaust gas comprising HC, CO and NO, preferably from one or more of a gasoline engine and a combined gasoline-natural gas engine, more preferably from a combined gasoline-natural gas engine, the method comprising using a catalyst according to the present invention.

The present invention is illustrated by the following first set of embodiments and combinations of embodiments resulting from the dependencies and back-references as indicated. In particular, it is noted that in each instance where a range of embodiments is mentioned, for example in the context of a term such as "The three-way conversion catalyst of any one of embodiments 1 to 4", every embodiment in this range is meant to be explicitly disclosed for the skilled person, i.e. the wording of this term is to be understood by the skilled person as being synonymous to "The three-way conversion catalyst of any one of embodiments 1, 2, 3 and 4". Further, it is explicitly noted that the following sets of embodiments are not the set of claims determining the extent of protection, but represent a suitably structured part of the description directed to general and preferred aspects of the present invention.

1. A three-way conversion catalyst for the treatment of an exhaust gas comprising NO, CO and HC, the catalyst comprising:
   (i) a substrate comprising an inlet end, an outlet end, a substrate axial length extending from the inlet end to the outlet end and a plurality of passages defined by internal walls of the substrate extending therethrough;
   (ii) a first coating comprising rhodium supported on a first oxidic component;
   (iii) a second coating comprising palladium supported on a non-zeolitic oxidic material, wherein the non-zeolitic oxidic material comprises manganese and a second oxidic component, wherein from 0 to 0.001 weight-% of the second coating consists of platinum;
   wherein the first coating is disposed on the surface of the internal walls of the substrate over x % of the substrate axial length, with x being in the range of from 80 to 100;
   wherein the second coating extends over y % of the substrate axial length from the inlet end to the outlet end and is disposed on the first coating, with y being in the range of from 20 to x.

2. The three-way conversion catalyst of embodiment 1, wherein x is in the range of from 90 to 100, preferably in the range of from 95 to 100, more preferably in the range of from 98 to 100, more preferably in the range of from 99 to 100.

3. The three-way conversion catalyst of embodiment 1 or 2, wherein y is in the range of from 30 to 80, preferably in the range of from 40 to 60, more preferably in the range of from 45 to 55.

4. The three-way conversion catalyst of embodiment 1 or 2, wherein y is in the range of from 80 to x, preferably in the range of from 90 to x, more preferably wherein y is x.

5. The three-way conversion catalyst of any one of embodiments 1 to 4, wherein the first coating comprises rhodium, calculated as elemental rhodium, at a loading in the range of from 2 to 100 g/ft$^3$, preferably in the range of from 3 to 70 g/ft$^3$, more preferably in the range of from 4 to 30 g/ft$^3$.

6. The three-way conversion catalyst of any one of embodiments 1 to 5, wherein the first oxidic component comprised in the first coating is selected from the group consisting of alumina, ceria, silica, zirconia, titania, a mixture of two or more thereof and a mixed oxide of two or more thereof, preferably selected from the group consisting of alumina, titania, zirconia, a mixture of two or more thereof and a mixed oxide of two or more thereof, more preferably selected from the group consisting of alumina, zirconia, a mixture of two thereof, and a mixed oxide of two thereof, more preferably alumina.

7. The three-way conversion catalyst of any one of embodiments 1 to 6, wherein the first coating further comprises a platinum group metal other than rhodium, wherein the platinum group metal other than rhodium is preferably selected from the group consisting of platinum, osmium, palladium, iridium, and a mixture of two or more thereof, more preferably selected from the group consisting of platinum, osmium, palladium, and a mixture of two or more thereof, more preferably selected from the group consisting of platinum, palladium and a mixture of two thereof, more preferably palladium.

8. The three-way conversion catalyst of embodiment 7, wherein the first coating comprises the platinum group metal other than rhodium, preferably palladium, calculated as elemental platinum group metal, at a loading, in the range of from 2 to 100 g/ft$^3$, preferably in the range of from 30 to 80 g/ft$^3$, more preferably in the range of from 40 to 60 g/ft$^3$, more preferably in the range of from 45 to 55 g/ft$^3$.

9. The three-way conversion catalyst of embodiment 7 or 8, wherein the first coating comprises the platinum group metal other than rhodium, calculated as elemental platinum group metal, at a loading, (11), and rhodium, calculated as elemental rhodium, at a loading, (12), wherein the loading ratio of (11):(12) is in the range of from 1:1 to 10:1, preferably in the range of from 2:1 to 8:1, more preferably in the range of from 4:1 to 7:1, more preferably in the range of from 5:1 to 6:1.

10. The three-way conversion catalyst of any one of embodiments 7 to 9, wherein the platinum group metal other than rhodium is supported on a third oxidic component, wherein the third oxidic component is preferably selected from the group consisting of alumina, silica, ceria, zirconia, titania, a mixture of two or more thereof and a mixed oxide of two or more thereof, more preferably selected from the group consisting of alumina, zirconia, titania, a mixture of two or more thereof and a mixed oxide of two or more thereof, more preferably selected from the group consisting of alumina, zirconia, a mixture of two thereof, and a mixed oxide of two thereof, more preferably alumina.

11. The three-way conversion catalyst of embodiment 10, wherein the platinum group metal other than rhodium is further supported on a first oxygen storage compound, wherein the first oxygen storage compound preferably comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium, lanthanum, and praseodymium, more preferably one or more of zirconium, yttrium and lanthanum.

12. The three-way conversion catalyst of embodiment 11, wherein the first oxygen compound comprises a mixed oxide comprising cerium, zirconium, yttrium and lanthanum;
    wherein preferably from 95 to 100 weight-%, more preferably from 98 to 100 weight-%, more preferably from 99 to 100 weight-%, more preferably from 99.5 to 100 weight-% of the first oxygen storage compound consist of a mixed oxide comprising cerium, zirconium, yttrium and lanthanum;
    wherein more preferably from 10 to 70 weight-%, more preferably from 20 to 50 weight-%, more preferably from 25 to 40 weight-%, of the first oxygen storage compound consist of cerium, calculated as CeO$_2$, and more preferably from 20 to 80 weight-%, more preferably from 30 to 75 weight-%, more preferably from 50 to 70 weight-%, of the first oxygen storage compound consist of zirconium, calculated as ZrO$_2$.

13. The three way conversion catalyst of embodiment 11 or 12, wherein the first coating comprises the first oxygen storage compound at a loading in the range of from 0.3 to 5 g/in$^3$, preferably in the range of from 0.4 to 2 g/in$^3$, more preferably in the range of from 0.5 to 1.5 g/in$^3$, more preferably in the range of from 0.5 to 1.0 g/in$^3$.

14. The three-way conversion catalyst of any one of embodiments 11 to 13, wherein from 95 to 100 weight-%, preferably from 98 to 100 weight-%, more preferably from 99 to 100 weight-%, more preferably from 99.5 to 100 weight-%, of the platinum group metal other than rhodium comprised in the first coating is supported on the third oxidic component and on the first oxygen storage compound;
    wherein preferably from 5 to 70 weight-%, more preferably from 10 to 50 weight-%, more preferably from 20 to 40 weight-%, of the platinum group metal other than rhodium comprised in the first coating is supported on the third oxidic component and preferably from 30 to 95 weight-%, more preferably from 50 to 90 weight-%, more preferably from 60 to 80 weight-%, of the platinum group metal other than rhodium comprised in the first coating is supported on the first oxygen storage compound.

15. The three-way conversion catalyst of any one of embodiments 1 to 14, wherein the first coating comprises the first oxidic component, and preferably a third oxidic component as defined in embodiment 10, at a loading in the range of from 0.3 to 8 g/in$^3$, preferably in the range of from 0.5 to 4 g/in$^3$, more preferably in the range of from 0.7 to 1.5 g/in$^3$.

16. The three-way conversion catalyst of any one of embodiments 1 to 15, wherein the first coating further comprises a promoter, the promoter comprising one or more of a barium oxide, a zirconium oxide, a strontium oxide, and a lanthanum oxide, preferably one or more of a barium oxide and a zirconium oxide, wherein the promoter more preferably comprises, more preferably consists of, a barium oxide and a zirconium oxide;

wherein the catalyst more preferably comprises the promoter at a loading in the range of from 0.02 to 0.2 g/in$^3$, more preferably in the range of from 0.05 to 0.12 g/in$^3$.

17. The three-way conversion catalyst of any one of embodiments 1 to 16, wherein the catalyst comprises the first coating at a loading in the range of from 0.5 to 10 g/in$^3$, preferably in the range of from 0.75 to 5 g/in$^3$, more preferably in the range of from 1 to 3 g/in$^3$, more preferably in the range of from 1.25 to 2.5 g/in$^3$.

18. The three-way conversion catalyst of any one of embodiments 11 to 14, wherein from 95 to 100 weight-%, preferably from 98 to 100 weight-%, more preferably from 99 to 100 weight-% of the first coating consist of rhodium on the first oxidic component, preferably on alumina, the platinum group metal other than rhodium supported on the third oxidic component, preferably on alumina, the platinum group metal other than rhodium supported on the first oxygen storage compound, and preferably a promotor as defined in embodiment 16.

19. The three-way conversion catalyst of any one of embodiments 1 to 18, wherein from 0 to 0.001 weight-%, preferably from 0 to 0.0001 weight-%, more preferably from 0.00001 weight-%, of the first coating consist of manganese.

20. The three-way conversion catalyst of any one of embodiments 1 to 19, wherein from 0 to 0.001 weight-%, preferably from 0 to 0.0001 weight-%, more preferably from 0.00001 weight-%, of the first coating consist of one or more of a zeolitic material and a vanadium containing compound, preferably a zeolitic material and a vanadium containing compound.

21. The three-way conversion catalyst of any one of embodiments 1 to 20, wherein manganese comprised in the non-zeolitic oxidic material of the second coating is present as an oxide of manganese, preferably as manganese dioxide ($MnO_2$), wherein manganese dioxide is more preferably supported on the second oxidic component.

22. The three-way conversion catalyst of any one of embodiments 1 to 21, wherein the second coating comprises in the range of from 1 to 10 weight-%, preferably in the range of from 2 to 9 weight-%, more preferably in the range of from 4 to 9 weight-%, of manganese, calculated as $MnO_2$, based on the weight of the non-zeolitic oxidic material.

23. The three-way conversion catalyst of any one of embodiments 1 to 22, wherein the second oxidic component comprised in the non-zeolitic oxidic material of the second coating is selected from the group consisting of alumina, silica, ceria, zirconia, titania, a mixture of two or more thereof, and a mixed oxide of two or more thereof, preferably selected from the group consisting of alumina, ceria, titania, a mixture of two or more thereof, and a mixed oxide of two or more thereof, more preferably selected from the group consisting of alumina, ceria, a mixture of two thereof, and a mixed oxide of two thereof, more preferably alumina.

24. The three-way conversion catalyst of any one of embodiments 1 to 23, wherein from 98 to 100 weight-%, preferably from 99 to 100 weight-%, more preferably from 99.5 to 100 weight-% of the non-zeolitic oxidic material consist of manganese, calculated as $MnO_2$, and the second oxidic component.

25. The three-way conversion catalyst of any one of embodiments 1 to 24 wherein the second coating comprises the non-zeolitic oxidic material at a loading in the range of from 0.3 to 5 g/in$^3$, preferably in the range of from 0.4 to 2 g/in$^3$, more preferably in the range of from 0.4 to 1.5 g/in$^3$, more preferably in the range of from 0.4 to 1.0 g/in$^3$.

26. The three-way conversion catalyst of any one of embodiments 1 to 25, wherein the second coating comprises palladium, calculated as elemental palladium, at a loading in the range of from 20 to 200 g/ft$^3$, preferably in the range of from 30 to 150 g/ft$^3$, more preferably in the range of from 50 to 120 g/ft$^3$, more preferably in the range of from 50 to 80 g/ft$^3$.

27. The three-way conversion catalyst of any one of embodiments 1 to 26, wherein the second coating further comprises a second oxygen storage compound, wherein the second oxygen storage compound preferably comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium, lanthanum, and praseodymium, more preferably one or more of zirconium, yttrium and lanthanum.

28. The three-way conversion catalyst of embodiment 27, wherein the second oxygen storage compound comprises a mixed oxide comprising cerium, zirconium, yttrium and lanthanum;

wherein preferably from 95 to 100 weight-%, more preferably from 98 to 100 weight-%, more preferably from 99 to 100 weight-%, more preferably from 99.5 to 100 weight-% of the second oxygen storage compound consist of a mixed oxide comprising cerium, zirconium, yttrium and lanthanum;

wherein more preferably from 10 to 70 weight-%, more preferably from 20 to 50 weight-%, more preferably from 25 to 40 weight-%, of the second oxygen storage compound consist of cerium, calculated as $CeO_2$, and more preferably from 20 to 80 weight-%, more preferably from 30 to 75 weight-%, more preferably from 50 to 70 weight-%, of the second oxygen storage compound consist of zirconium, calculated as $ZrO_2$.

29. The three-way conversion catalyst of embodiment 27 or 28, wherein the second coating comprises the second oxygen storage compound at a loading in the range of from 0.3 to 5 g/in$^3$, preferably in the range of from 0.4 to 3 g/in$^3$, more preferably in the range of from 0.6 to 1.75 g/in$^3$.

30. The three-way conversion catalyst of any one of embodiments 27 to 29, wherein from 95 to 100 weight-%, preferably from 98 to 100 weight-%, more preferably from 99 to 100 weight-%, more preferably from 99.5 to 100 weight-%, of the palladium comprised in the second coating is supported on the non-zeolitic oxidic material and on the second oxygen storage compound;

wherein preferably from 30 to 70 weight-%, more preferably from 40 to 60 weight-%, more preferably from 45 to 55 weight-%, of the palladium comprised in the second coating is supported on the non-zeolitic oxidic material and preferably from 30 to 70 weight-%, more preferably from 40 to 60 weight-%, more preferably from 45 to 55 weight-%, of the palladium comprised in the second coating is supported on the second oxygen storage compound.
31. The three-way conversion catalyst of any one of embodiments 1 to 30, wherein the second coating further comprises a promoter, the promoter comprising one or more of a barium oxide, a zirconium oxide, a strontium oxide, and a lanthanum oxide, preferably one or more of a barium oxide and a zirconium oxide, wherein the promoter more preferably comprises, more preferably consists of, a barium oxide.
32. The three-way conversion catalyst of embodiment 31, wherein the second coating comprises the promoter at a loading in the range of from 0.02 to 0.2 g/in³, preferably in the range of from 0.05 to 0.18 g/in³.
33. The three-way conversion catalyst of any one of embodiments 27 to 30, wherein from 95 to 100 weight-%, preferably from 98 to 100 weight-%, more preferably from 99 to 100 weight-% of the second coating consist of palladium supported on the non-zeolitic oxidic material, comprising manganese and the second oxidic component, and palladium supported on the second oxygen storage compound, and preferably a promoter as defined in embodiment 31 or 32.
34. The three-way conversion catalyst of any one of embodiments 1 to 33, wherein from 0 to 0.0001 weight-%, preferably from 0 to 0.00001 weight-%, of the second coating consists of platinum.
35. The three-way conversion catalyst of any one of embodiments 1 to 34, wherein from 0 to 0.001 weight-%, preferably from 0 to 0.0001 weight-%, more preferably from 0 to 0.00001 weight-%, of the second coating consist of rhodium, preferably of rhodium, iridium and osmium.
36. The three-way conversion catalyst of any one of embodiments 1 to 35, wherein from 0 to 0.001 weight-%, preferably from 0 to 0.0001 weight-%, more preferably from 0 to 0.00001 weight-%, of the second coating consist of a molecular sieve.
37. The three-way conversion catalyst of any one of embodiments 1 to 36, wherein the catalyst consists of the substrate, the first coating and the second coating.
38. The three-way conversion catalyst of any one of embodiments 1 to 37, wherein the catalyst comprises the first coating at a first loading, (L1), and the second coating at a second loading, (L2), wherein the loading ratio of (L1):(L2) is in the range of from 4:1 to 1:4, preferably in the range of from 3:1 to 1:3, more preferably in the range of from 2:1 to 1:2, more preferably in the range of from 1.5:1 to 1:1.5.
39. The three-way conversion catalyst of embodiment 38, wherein the loading ratio of (L1):(L2) is in the range of from 1.2:1 to 1:1.2.
40. The three-way conversion catalyst of any one of embodiments 1 to 39, wherein the substrate of the catalyst comprises a ceramic or metallic material.
41. The three-way conversion catalyst of any one of embodiments 1 to 40, wherein the substrate of the catalyst comprises, preferably consists of, a ceramic material, wherein the ceramic material preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.
42. The three-way conversion catalyst of any one of embodiments 1 to 40, wherein the substrate of the catalyst comprises, preferably consists of, a metallic material, wherein the metallic material preferably comprises, more preferably consists of, oxygen and one or more of iron, chromium, and aluminum.
43. The three-way conversion catalyst of any one of embodiments 1 to 42, wherein the substrate according to (i) is a flow-through substrate, preferably a cordierite flow-through substrate.
44. The three-way conversion catalyst of any one of embodiments 1 to 42, wherein the substrate according to (i) is a wall-flow filter substrate, preferably a cordierite wall-flow filter substrate.
45. A process for preparing a three-way conversion catalyst, preferably the three-way conversion catalyst according to any one of embodiments 1 to 44, the process comprising:
   (a) providing a substrate comprising an inlet end, an outlet end, a substrate axial length extending from the inlet end to the outlet end and a plurality of passages defined by internal walls of the substrate extending therethrough;
   (b) preparing a slurry comprising rhodium, a first oxidic component and water; disposing the slurry on the surface of the internal walls of the substrate over x % of the substrate axial length, from the inlet end to the outlet end of the substrate, or from the outlet end to the inlet end of the substrate, with x being in the range of from 80 to 100; calcining the obtained slurry-treated substrate, obtaining a substrate coated with a first coating;
   (c) preparing a slurry comprising water, palladium and a non-zeolitic oxidic material, comprising manganese and a second oxidic component; disposing the slurry on the first coating of the coated substrate obtained in (b) over y % of the substrate axial length from the inlet end to the outlet end of the substrate, with y being in the range of from 20 to x; calcining the obtained slurry-treated substrate, obtaining a substrate coated with a first coating and a second coating, wherein from 0 to 0.001 weight-% of the second coating consist of platinum.
46. The process of embodiment 45, wherein (b) comprises:
   (b.1) impregnating the rhodium on the first oxidic component; calcining the rhodium on the first oxidic component, preferably in a gas atmosphere having a temperature in the range of from 300 to 800° C., more preferably in the range of from 500 to 700° C.;
   (b.2) preferably impregnating a platinum group metal other than rhodium as defined in any one of embodiments 7 to 9 on a third oxidic component as defined in embodiment 10; calcining the platinum group metal other than rhodium on the third oxidic component, preferably in a gas atmosphere having a temperature in the range of from 300 to 800° C., more preferably in the range of from 500 to 700° C.;
   (b.3) preferably impregnating the platinum group metal other than rhodium according to (b.2) on a first oxygen storage compound as defined in embodiment 11 or 12; calcining the platinum group metal other than rhodium on the first oxygen storage compound, more preferably in a gas atmosphere having a temperature in the range of from 300 to 800° C., more preferably in the range of from 500 to 700° C.; preparing a slurry comprising the obtained calcined platinum group metal other than rhodium on the first oxygen storage compound, water, and more preferably one or more of an alcohol and a promoter as defined in embodiment 16; milling the obtained slurry until the particles of the slurry have a Dv90 in the range of from 1 to 20 micrometers, more preferably in the range of from 3 to 10 micrometers, the Dv90 being determined as in Reference Example 2;

(b.4) mixing the calcined rhodium on the first oxidic component obtained in (b.1), water, preferably the calcined platinum group metal other than rhodium on the third oxidic component obtained in (b.2), and preferably one or more of an alcohol and a promoter as defined in embodiment 16, obtaining a slurry; milling the obtained slurry until the particles of the slurry have a Dv90 in the range of from 5 to 30 micrometers, preferably in the range of from 10 to 20 micrometers, the Dv90 being determined as in Reference Example 2;

(b.5) preferably admixing the slurry obtained in (b.3) and the slurry obtained in (b.4); milling the obtained slurry until the particles of the slurry have a Dv90 in the range of from 5 to 30 micrometers, more preferably in the range of from 10 to 15 micrometers, the Dv90 being determined as in Reference Example 2;

(b.6) disposing the slurry obtained in (b.4), more preferably the slurry obtained in (b.5), on the surface of the internal walls of the substrate over x % of the substrate axial length, from the inlet end to the outlet end of the substrate, or from the outlet end to the inlet end of the substrate, with x being in the range of from 80 to 100;

(b.7) optionally drying the obtained slurry-treated substrate obtained in (b.6);

(b.8) calcining the obtained slurry-treated substrate obtained in (b.6), or the dried slurry-treated substrate obtained in (b.7).

47. The process of embodiment 46, comprising adjusting the pH of the aqueous phase of the slurry obtained in one or more of (b.3), (b.4) and (b.5), preferably in (b.3) and (b.4) and (b.5), to a value in the range of from 2 to 7, preferably in the range of from 3 to 5, more preferably by adding an acid, more preferably a nitric acid.

48. The process of embodiment 46 or 47, wherein the alcohol used in one or more of (b.3) and (b.4), preferably in (b.3) and (b.4), is a n-octanol.

49. The process of any one of embodiments 46 to 48, wherein drying according to (b.7) is performed in a gas atmosphere having a temperature in the range of from 90 to 200° C., preferably in the range of from 130 to 150° C., the gas atmosphere preferably comprising oxygen.

50. The process of any one of embodiments 46 to 49, wherein drying according to (b.7) is performed in a gas atmosphere for a duration in the range of from 10 minutes to 3 hours, preferably in the range of from 20 to 40 minutes, the gas atmosphere preferably comprising oxygen.

51. The process of any one of embodiments 46 to 50, wherein calcining according to (b.8) is performed in a gas atmosphere having a temperature in the range of from 300 to 900° C., preferably in the range of from 500 to 700° C., the gas atmosphere preferably comprising oxygen.

52. The process of any one of embodiments 46 to 51, wherein calcining according to (b.8) is performed in a gas atmosphere for a duration in the range of from 1 to 8 hours, preferably in the range of from 1.5 to 3 hours, the gas atmosphere preferably comprising oxygen.

53. The process of any one of embodiments 45 to 52, wherein (c) comprises (c.1) impregnating palladium on the non-zeolitic oxidic material comprising manganese and a second oxidic component; calcining the palladium on the non-zeolitic oxidic material, preferably in a gas atmosphere having a temperature in the range of from 300 to 800° C., more preferably in the range of from 500 to 700° C.;

(c.2) preparing a slurry comprising the calcined palladium on the non-zeolitic material obtained in (c.1), water, and preferably one or more of an alcohol and a promotor as defined in embodiment 31 or 32; milling the obtained slurry until the particles of the slurry have a Dv90 in the range of from 5 to 30 micrometers, more preferably in the range of from 10 to 20 micrometers, the Dv90 being determined as in Reference Example 2;

(c.3) preferably impregnating palladium on a second oxygen storage compound as defined in any one of embodiment 27 to 29; calcining palladium on the second oxygen storage compound, more preferably in a gas atmosphere having a temperature in the range of from 300 to 800° C., more preferably in the range of from 500 to 700° C.; preparing a slurry comprising the obtained calcined palladium on the second oxygen storage compound, water, and more preferably one or more of an alcohol and a promoter as defined in embodiment 31 or 32; milling the obtained slurry until the particles of the slurry have a Dv90 in the range of from 1 to 20 micrometers, more preferably in the range of from 3 to 10 micrometers, the Dv90 being determined as in Reference Example 2;

(c.4) preferably admixing the slurry obtained in (c.2) and the slurry obtained in (c.3);

(c.5) milling the slurry obtained in (c.2), preferably the slurry obtained in (c.4), until the particles of the slurry have a Dv90 in the range of from 2 to 20 micrometers, the Dv90 being determined as in Reference Example 2;

(c.6) disposing the slurry obtained in (c.5) on the first coating of the coated substrate obtained in (b) over y % of the substrate axial length on the first coating from the inlet end to the outlet end of the substrate, with y being in the range of from 20 to x;

(c.7) optionally drying the obtained slurry-treated substrate obtained in (c.6);

(c.8) calcining the obtained slurry-treated substrate obtained in (c.6), or the dried slurry-treated substrate obtained in (c.7).

54. The process of embodiment 53, comprising adjusting the pH of the aqueous phase of the slurry obtained in one or more of (c.2), (c.3) and (c.4), preferably in (c.2) and (c.3) and (c.4), to a value in the range of from 2 to 7, preferably in the range of from 3 to 5, more preferably by adding an acid, more preferably a nitric acid.

55. The process of embodiment 53 or 54, wherein milling according to (c.5) is performed until the particles of the slurry have a Dv90 in the range of from 5 to 18 micrometers, preferably in the range of from 10 to 15 micrometers.

56. The process of any one of embodiments 53 to 55, wherein drying according to (c.7) is performed in a gas atmosphere having a temperature in the range of from 90 to 200° C., preferably in the range of from 130 to 150° C., the gas atmosphere preferably comprising oxygen.

57. The process of any one of embodiments 53 to 56, wherein drying according to (c.7) is performed in a gas atmosphere for a duration in the range of from 10 minutes to 3 hours, preferably in the range of from 20 to 40 minutes, the gas atmosphere preferably comprising oxygen.

58. The process of any one of embodiments 53 to 57, wherein calcining according to (c.8) is performed in a gas atmosphere having a temperature in the range of from 300 to 900° C., preferably in the range of from 500 to 700° C., the gas atmosphere preferably comprising oxygen.

59. The process of any one of embodiments 53 to 58, wherein calcining according to (c.8) is performed in a gas atmosphere for a duration in the range of from 1 to 8 hours, preferably in the range of from 1.5 to 3 hours, the gas atmosphere preferably comprising oxygen.

60. The process of any one of embodiments 45 to 59, wherein disposing the slurry according to (b) is performed by spraying or immersing the substrate, preferably by immersing the substrate.

61. The process of any one of embodiments 45 to 60, wherein disposing the slurry according to (c) is performed by spraying or immersing the substrate, preferably by immersing the substrate.

62. The process of any one of embodiments 45 to 61, wherein x is in the range of from 90 to 100, preferably in the range of from 95 to 100, more preferably in the range of from 98 to 100, more preferably in the range of from 99 to 100.

63. The process of any one of embodiments 45 to 62, wherein y is in the range of from 30 to 80, preferably in the range of from 40 to 60, more preferably in the range of from 45 to 55.

64. The process of any one of embodiments 45 to 62, wherein y is in the range of from 80 to x, preferably in the range of from 90 to x, more preferably wherein y is x.

65. The process of any one of embodiments 45 to 64 consisting of (a), (b), and (c).

66. A three-way conversion catalyst, preferably the three-way conversion catalyst according to any one of embodiments 1 to 44, obtained or obtainable or preparable or prepared by a process according to any one of embodiments 45 to 65, preferably 65.

67. An exhaust gas treatment system downstream of and in fluid communication with an engine, the system comprising a three-way conversion catalyst according to any one of embodiments 1 to 44 and 66.

68. The gas treatment system of embodiment 67, wherein the engine is one or more of a gasoline engine and a combined gasoline-natural gas engine, preferably a combined gasoline-natural gas engine.

69. The gas treatment system of embodiment 67 or 68, wherein the exhaust gas stream of the engine comprises hydrocarbon (HC), carbon monoxide (CO), and nitrogen oxide (NO).

70. Use of a three-way conversion catalyst according to any one of embodiments 1 to 44 and 66 for the treatment of an exhaust gas comprising HC, CO and NO/NOx, preferably from a gasoline engine, more preferably a combined gasoline-natural gas engine.

71. Method for the treatment of an exhaust gas comprising HC, CO, and NO/NOx, preferably from one or more of a gasoline engine and a combined gasoline-natural gas engine, more preferably a combined gasoline-natural gas engine, the method comprising using a three-way conversion catalyst according to any one of embodiments 1 to 44 and 66.

72. The three-way conversion catalyst of any one of embodiments 1 to 44, wherein the second coating according to (iii) is the coating (ii) as defined in any one of embodiments 1' to 17'.

The present invention is further illustrated by the following second set of embodiments and combinations of embodiments resulting from the dependencies and back-references as indicated. The second set of embodiments may be combined with the first set of embodiments above.

1'. A catalyst for the treatment of an exhaust gas comprising HC, CO and NO, the catalyst comprising:
  (i) a substrate comprising an inlet end, an outlet end, a substrate axial length extending from the inlet end to the outlet end and a plurality of passages defined by internal walls of the substrate extending therethrough;
  (ii) a coating disposed on the surface of the internal walls of the substrate, wherein the coating comprises palladium supported on a non-zeolitic oxidic material comprising manganese and an oxidic component, the coating further comprising a promotor comprising barium; wherein from 0 to 0.001 weight-% of the coating consists of platinum.

2'. The catalyst of embodiment 1', wherein the coating extends over y1% of the substrate axial length from the inlet end to the outlet end of the substrate, or from the outlet end to the inlet of the substrate, with y1 being in the range of from 80 to 100, preferably in the range of from 90 to 100, more preferably in the range of from 95 to 100, more preferably in the range of from 98 to 100, more preferably in the range of from 99 to 100.

3'. The catalyst of embodiment 1' or 2', wherein manganese comprised in the non-zeolitic oxidic material of the coating is present as an oxide of manganese, preferably as manganese dioxide ($MnO_2$), wherein manganese dioxide is more preferably supported on the oxidic component.

4'. The catalyst of any one of embodiment 1' to 3', wherein the coating comprises in the range of from 1 to 10 weight-%, preferably in the range of from 2 to 9 weight-%, more preferably in the range of from 4 to 9 weight-%, of manganese, calculated as $MnO_2$, based on the weight of the non-zeolitic oxidic material.

5'. The catalyst of any one of embodiments 1' to 4', wherein the oxidic component comprised in the non-zeolitic oxidic material is selected from the group consisting of alumina, ceria, silica, zirconia, titania, a mixture of two or more thereof, and a mixed oxide of two or more thereof, preferably selected from the group consisting of alumina, ceria, titania, a mixture of two or more thereof, and a mixed oxide of two or more thereof, more preferably selected from the group consisting of alumina, ceria, a mixture of two thereof, and a mixed oxide of two thereof, more preferably alumina.

6'. The catalyst of any one of embodiments 1' to 5', wherein from 98 to 100 weight-%, preferably from 99 to 100 weight-%, more preferably from 99.5 to 100 weight-% of the non-zeolitic oxidic material consist of manganese, calculated as $MnO_2$, and the oxidic component.

7'. The catalyst of any one of embodiments 1' to 6', wherein the coating comprises palladium, calculated as elemental palladium, at a loading in the range of from 20 to 200 g/ft$^3$, preferably in the range of from 30 to 150 g/ft$^3$, more preferably in the range of from 50 to 120 g/ft$^3$.

8'. The catalyst of any one of embodiments 1 to 7', wherein the coating comprises the non-zeolitic oxidic material at a loading in the range of from 0.5 to 4 g/in$^3$, preferably in the range of from 1 to 3 g/in$^3$, more preferably in the range of from 1 to 1.8 g/in$^3$.

9'. The catalyst of any one of embodiments 1' to 8', wherein the promoter comprised in the coating comprises, preferably consists of, a barium oxide.

10'. The catalyst of any one of embodiments 1' to 9', wherein the coating comprises the promoter at a loading in the range of from 0.02 to 0.2 g/in$^3$, preferably in the range of from 0.05 to 0.1 g/in$^3$.

11'. The catalyst of any one of embodiments 1' to 10', wherein from 95 to 100 weight-%, preferably from 98 to 100 weight-%, more preferably from 99 to 100 weight-% of the coating consist of palladium supported on the non zeoltic oxidic material, comprising manganese and the oxidic component, and the promoter comprising barium.

12'. The catalyst of any one of embodiments 1' to 11', wherein from 0 to 0.0001 weight-%, preferably from 0 to 0.00001 weight-%, of the coating consists of platinum.

13'. The catalyst of any one of embodiments 1' to 12', wherein from 0 to 0.001 weight-%, preferably from 0 to 0.0001 weight-%, more preferably from 0 to 0.00001 weight-%, of the coating consist of rhodium, preferably of rhodium, iridium and osmium.

14'. The catalyst of any one of embodiments 1' to 13', wherein from 0 to 0.001 weight-%, preferably from 0 to 0.0001 weight-%, more preferably from 0 to 0.00001 weight-%, of the coating consist of a molecular sieve.

15'. The catalyst of any one of embodiments 1' to 14', wherein the catalyst consists of the substrate and the coating.

16'. The catalyst of any one of embodiments 1 to 15', wherein the substrate according to (i) is a flow-through substrate;
wherein the flow-through substrate preferably comprises, more preferably consists of, a ceramic material, wherein the ceramic material more preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

17'. The catalyst of any one of embodiments 1 to 15', wherein the substrate according to (i) is a wall-flow filter substrate;
wherein the wall-flow filter substrate preferably comprises, more preferably consists of, a ceramic material, wherein the ceramic material more preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

18'. A process for preparing a catalyst for the treatment of an exhaust gas comprising HC, CO and NO, preferably the catalyst according to any one of embodiments 1' to 17', the process comprising:
(A) providing a substrate comprising an inlet end, an outlet end, a substrate axial length extending from the inlet end to the outlet end and a plurality of passages defined by internal walls of the substrate extending therethrough;
(B) preparing a catalytic slurry comprising water, palladium, a non-zeolitic oxidic material, comprising manganese and an oxidic component, and a promoter comprising barium;
(C) disposing the slurry obtained in (B) on the surface of the internal walls of the substrate provided in (A); calcining the obtained slurry-treated substrate, obtaining a substrate coated with a coating, wherein from 0 to 0.01 weight-% of the coating consist of platinum.

19'. The process of embodiment 18', wherein (B) comprises
(B.1) impregnating palladium on the non-zeolitic oxidic material comprising manganese and an oxidic component;
(B.2) calcining the palladium on the non-zeolitic oxidic material obtained in (B.1), preferably in a gas atmosphere having a temperature in the range of from 300 to 800° C., more preferably in the range of from 500 to 700° C.;
(B.3) preparing a mixture comprising water, a promotor comprising barium, and preferably an alcohol, more preferably n-octanol;
(B.4) adding the calcined palladium on the non-zeolitic oxidic material obtained in (B.2) to the mixture obtained in (B.3), obtaining an intermediate slurry;
(B.5) preferably adjusting the pH of the aqueous phase of the intermediate slurry obtained in (B.4) to a value in the range of from 2 to 7, more preferably in the range of from 3 to 5;
(B.6) milling the intermediate slurry obtained in (B.4), preferably the slurry obtained in (B.5), until the particles of the slurry have a Dv90 in the range of from 2 to 20 micrometers, preferably in the range of from 10 to 15 micrometers, the Dv90 being determined as in Reference Example 2, obtaining a catalytic slurry.

20'. The process of embodiment 18' or 19', wherein (C) comprises
(C.1) disposing the catalytic slurry obtained in (B) on the surface of the internal walls of the substrate provided in (A) over y1% of the substrate axial length from the inlet end to the outlet end of the substrate, with y1 being in the range of from 80 to 100, preferably in the range of from 90 to 100, more preferably in the range of from 95 to 100, more preferably in the range of from 98 to 100, more preferably in the range of from 99 to 100;
(C.2) optionally drying the obtained slurry-treated substrate obtained in (C.1);
(C.3) calcining the obtained slurry-treated substrate obtained in (C.1), or the dried slurry-treated substrate obtained in (C.2);
wherein disposing according (C.1) is preferably performed by spraying or immersing the substrate, more preferably by immersing the substrate.

21'. The process of embodiment 20', wherein drying according to (C.2) is performed in a gas atmosphere having a temperature in the range of from 90 to 200° C., preferably in the range of from 130 to 150° C., the gas atmosphere preferably comprising oxygen.

22'. The process of embodiment 20' or 21', wherein drying according to (C.2) is performed in a gas atmosphere for a duration in the range of from 10 minutes to 3 hours, preferably in the range of from 20 to 40 minutes, the gas atmosphere preferably comprising oxygen.

23'. The process of any one of embodiments 20' to 22', wherein calcining according to (C.3) is performed in a gas atmosphere having a temperature in the range of from 300 to 900° C., preferably in the range of from 500 to 700° C., the gas atmosphere preferably comprising oxygen.

24'. The process of any one of embodiments 20' to 23', wherein calcining according to (C.3) is performed in a gas atmosphere for a duration in the range of from 1 to 8 hours, preferably in the range of from 1.5 to 3 hours, the gas atmosphere preferably comprising oxygen.

25'. A catalyst for the treatment of an exhaust gas comprising HC, CO and NO, preferably the catalyst according to any one of embodiments 1' to 17', obtainable or obtained or preparable or prepared by a process according to any one of embodiments 18' to 24'.

26'. Use of a catalyst according to any one of embodiments 1' to 16' and 25' for the treatment of an exhaust gas comprising HC, CO and NO, preferably from one or more of a gasoline engine and a combined gasoline-natural gas engine, more preferably from a combined gasoline-natural gas engine.

27'. A method for the treatment of an exhaust gas comprising HC, CO and NO, preferably from one or more of a gasoline engine and a combined gasoline-natural gas engine, more preferably from a combined gasoline-natural gas engine, the method comprising using a catalyst according to any one of embodiments 1' to 16' and 25'.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A 5 and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. 10 "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Further, in the context of the present invention, the term "combined gasoline-natural gas engine" stands for an engine with a dual-mode, namely a gasoline mode and a (compressed) natural gas mode, wherein the hydrocarbon emissions from the (compressed) natural gas mode are predominately methane (more than about 80%). This could also be named a gasoline-natural gas hybrid engine.

Furthermore, in the context of the present invention, the term "consists of" with regard to the weight-% of one or more components indicates the weight-% amount of said component(s) based on 100 weight-% of the entity in question. For example, the wording "wherein from 0 to 0.001 weight-% of the second coating consists of platinum" indicates that among the 100 weight-% of the components of which said coating consists of, 0 to 0.001 weight-% is platinum.

The present invention is further illustrated by the following Reference Examples, Comparative Examples, and Examples.

EXAMPLES

Reference Example 1: Determination of BET Specific Surface Area of Alumina

The BET specific surface area of the alumina was determined according to DIN 66131 or DIN-ISO 9277 using liquid nitrogen.

Reference Example 2: Determination of the Volume-Based Particle Size Distributions The particle size distributions were determined by a static light scattering method using a Sympatec HELOS/BR-OM & QUIXEL wet dispersion equipment, fitted with laser (HeNe) diffraction sensor with 31 channel multielement detection range comprising 5 modules covering 0.1-875 microns.

Reference Example 3: General Coating Method

In order to coat a flow-through substrate with a slurry, the flow-through substrate was immersed vertically in a portion of a given slurry for a specific length of the substrate resulting in the targeted length of the coating to be applied. In this manner, the washcoat contacted the walls of the substrate. The sample was left in the slurry for a specific period of time, usually for 1-15 seconds. The substrate was then removed from the slurry, rotated 180° about its vertical axis and shaken gently at first and vigorously later to rid it of excess slurry, followed by blowing with compressed air (in the direction of initial slurry uptake).

Comparative Example 1: Preparation of a Catalyst not According to the Present Invention (56 g/ft$^3$ of Pd—no Manganese)

An alumina powder ($Al_2O_3$: about 100 weight-%, having a BET specific surface area of about 150 m$^2$/g, a Dv50 of 35 micrometers, a mean pore radius of 11 nm and a total pore volume of 0.9 ml/g) was impregnated with an aqueous mixture of deionized water and a palladium nitrate, such that the incipient point may not be exceeded. The amount of alumina was calculated such that the alumina loading in the catalyst after calcination was of 1.40 g/in$^3$. The obtained mixture of Pd-alumina (solid content: 65 weight-%) was calcined in a calciner at 590° C. for 2 hours (thermal fixation).

A mixture was prepared with distilled water, n-octanol (0.3 weight-% based on the weight of the washcoat after calcination) and barium nitrate. The amount of barium nitrate was calculated such that the final loading of BaO in the catalyst after calcination was 0.068 g/in$^3$. The amount of octanol was calculated such that it was 0.3 weight-% of the final washcoat loading Said mixture was stirred for approximately 10 minutes in a container at room temperature.

The calcined Pd-alumina powder was added slowly to the obtained mixture while stirring to obtain a slurry. The solid content of the slurry was set to about 40 weight-%. After an initial pH adjustment with nitric acid to 3.8, the slurry was milled until the particles of the slurry had a Dv90, determined as in Reference Example 2, of 12 micrometers with a final pH adjustment to 3.5. The obtained slurry was disposed over the full length of an uncoated flow-through cordierite honeycomb substrate (diameter: 2.54 cm (1 inch)× length: 10.16 cm (4 inches)), cylindrical shaped substrate with 400/(2.54)$^2$ cells per square centimeter and 0.1 millimeter (4 mil) wall thickness) using the coating method described in Reference Example 3. Afterwards, the coated substrate was dried at 140° C. in air for 30 minutes and was calcined at 590° C. in air for 2 hours.

The washcoat loading in the catalyst after calcination was 1.50 g/in$^3$, including 1.40 g/in$^3$ of alumina, 0.068 g/in$^3$ BaO and 56 g/ft$^3$ of Pd.

Comparative Example 2: Preparation of a Catalyst not According to the Present Invention (112 g/ft$^3$ of Pd—no Manganese)

The catalyst of Comparative Example 2 was prepared as the catalyst of Comparative Example 1, except that the washcoat loading in the catalyst after calcination was 1.53 g/in³, including 1.40 g/in³ of alumina, 0.068 g/in³ BaO and 112 g/ft³ of Pd.

Comparative Example 3: Preparation of a Catalyst not According to the Present Invention (167 g/ft³ of Pd—no Manganese)

The catalyst of Comparative Example 3 was prepared as the catalyst of Comparative Example 1, except that the washcoat loading in the catalyst after calcination was 1.56 g/in³, including 1.40 g/in³ of alumina, 0.068 g/in³ BaO and 167 g/ft³ of Pd.

Example 1: Preparation of a Catalyst (56 g/ft³ of Pd—Manganese)

The catalyst of Example 1 was prepared as the catalyst of Comparative Example 1, except that the alumina powder was replaced by an Mn-alumina powder (95 weight-% of $Al_2O_3$, 5 weight-% of $MnO_2$, having a BET specific surface area of about 132 m²/g, a Dv50 of 37.5 micrometers, a mean pore radius of 11.5 nm and a total pore volume of 0.8 ml/g). The washcoat loading in the catalyst after calcination was 1.50 g/in³, including 1.40 g/in³ of Mn-alumina, 0.068 g/in³ BaO and 56 g/ft³ of Pd.

Example 2: Performance Evaluation of the Catalysts of Example 1 and of Comparative Examples 1-3—CO, NO and HC Conversions All catalysts were aged together in one oven at 900° C. hydrothermally (10% $O_2$ and 10% steam) for 4 hours. Oven aging was done in an oven equipped with several gas lines for simultaneous dosage of several gases under controlled flow conditions.

All aged samples were evaluated individually, one at a time using a Gasoline System Simulator (GSS) reactor operated using the New European Drive Cycle (NEDC) test cycle implemented from a real vehicle in the Compressed Natural Gas (CNG) mode. To evaluate the impact of hydrothermal aging on the various technologies, the same samples were evaluated in the fresh state on the same reactor prior to the oven-aging. The results are displayed in FIG. 1.

CO conversion: As may be taken from FIG. 1, the catalyst of Example 1 exhibits CO conversions of about 84.5% (fresh) and of about 80% (aged) while the catalyst of Comparative Example 1 exhibits lower CO conversions of about 76% (fresh) and of about 71% (aged). This shows that the catalyst of Example 1 exhibits improved CO conversions under fresh and aged conditions compared to a catalyst with the same Pd loading but free of manganese. Further, the use of the catalyst of Example 1 enhances CO conversion improvement after ageing. Furthermore, the catalyst of Example 1 exhibits a CO conversion comparable to the catalyst of Comparative Example 2 which contains twice the palladium loading of Example 1 under fresh conditions. The trend is seemingly the same after oven-ageing, with improvements for the manganese containing catalyst. Finally, the catalyst of Example 1 exhibits CO conversions comparable to the catalyst of Comparative Example 3 which contains three times the palladium loading of Example 1 under fresh and aged conditions.

NO conversion: As may be taken from FIG. 1, the catalyst of Example 1 exhibits NO conversions of about 96% (fresh) and of about 87% (aged) while the catalyst of Comparative Example 1 exhibits NO conversions of about 87% (fresh) and of about 81% (aged). This shows that the catalyst of Example 1 exhibits improved NO conversion in fresh and aged states compared to a catalyst with the same Pd loading but free of manganese. Furthermore, the catalyst of Example 1 exhibits improved NO conversions compared to those obtained with the catalysts of Comparative Examples 2 and 3 under fresh conditions and comparable or slightly lower NO conversions compared to those obtained with the catalysts of Comparative Examples 2 and 3 after ageing.

HC conversion: As may be taken from FIG. 1, the catalyst of Example 1 exhibits HC conversions of about 83% (fresh) and of about 60% (aged). The HC conversion under fresh conditions obtained with the catalyst of Example 1 is comparable to those of Comparative Example 1. The HC conversions obtained with the catalysts of Comparative Examples 2 and 3 are higher than those obtained with the catalyst of Example 1. Without wanting to be bound to any theory, it may be explained by the fact that HC conversions are directly linked with the platinum group metal (PGM) amount. This is confirmed by the results outlined in Example 4 below.

Example 2 demonstrates that the catalyst according to the present invention offers improved CO and NO conversions while maintaining competitive HC conversion activity under fresh and aged conditions. This example further shows that by using alumina with manganese oxide ($MnO_2$) disposed thereon, it is possible to reduce the amount of a platinum group metal, in particular palladium, in a catalyst to obtain similar, or even improved, catalytic activities, especially CO and NOx.

Comparative Example 4: Preparation of a Catalyst not According to the Present Invention (112 g/ft³ Pt—Manganese)

An Mn-alumina powder (95 weight-% of $Al_2O_3$, 5 weight-% of $MnO_2$, having a BET specific surface area of about 132 m²/g, a Dv50 of 37.5 micrometers, a mean pore radius of 11.2 nm and a total pore volume of 0.8 ml/g) was impregnated with an aqueous mixture of a platinum nitrate and deionized water. The amount of Mn-alumina was calculated such that the Mn-alumina loading in the catalyst after calcination was of 1.40 g/in³. The obtained mixture of Pt-alumina (solid content: 65 weight-%) was calcined in a calciner at 590° C. for 2 hours (thermal fixation).

A mixture was prepared with distilled water, n-octanol (0.3 weight-% based on the weight of the washcoat after calcination) and barium nitrate. The amount of barium nitrate was calculated such that the final loading of BaO in the catalyst after calcination was 0.068 g/in³. Said mixture was stirred for approximately 10 minutes in a container at room temperature.

The calcined Pt-alumina powder was added slowly to the obtained mixture while stirring in order to obtain a slurry. The solid content of the slurry was set to about 40 weight-%. After an initial pH adjustment with nitric acid to 3.8, the slurry was milled until the particles of the slurry had a Dv90, determined as in Reference Example 2, of 12 micrometers with a final pH adjustment to 3.5. The obtained slurry was disposed over the full length of an uncoated flow-through cordierite honeycomb substrate (diameter: 2.54 cm (1 inch)× length: 10.16 cm (4 inches)), cylindrical shaped substrate with $600/(2.54)^2$ cells per square centimeter and 0.1 millimeter (4 mil) wall thickness) using the coating method described in Reference Example 3. Afterwards, the coated substrate was dried at 140° C. in air for 20 minutes and was calcined at 590° C. in air for 2 hours.

The washcoat loading in the catalyst after calcination was 1.53 g/in$^3$, including 1.40 g/in$^3$ of Mn-alumina, 0.068 g/in$^3$ BaO and 112 g/ft$^3$ of Pt.

Comparative Example 5: Preparation of a Catalyst not According to the Present Invention (112 g/ft$^3$ Pt—no Manganese)

The catalyst of Comparative Example 5 was prepared as the catalyst of Comparative Example 4, except that the Mn-alumina powder was replaced by the alumina powder used in Comparative Example 1. The washcoat loading in the catalyst after calcination was 1.53 g/in$^3$, including 1.40 g/in$^3$ of alumina, 0.068 g/in$^3$ BaO and 112 g/ft$^3$ of Pt.

Comparative Example 6: Preparation of a Catalyst not According to the Present Invention (112 g/ft$^3$ Pd—no Manganese)

The catalyst of Comparative Example 6 was prepared as the catalyst of Comparative Example 5, except that platinum nitrate was replaced by palladium nitrate. The washcoat loading in the catalyst after calcination was 1.53 g/in$^3$, including 1.40 g/in$^3$ of alumina, 0.068 g/in$^3$ BaO and 112 g/ft$^3$ of Pd.

Example 3: Preparation of a Catalyst (112 g/ft$^3$ Pd—Manganese)

The catalyst of Example 3 was prepared as the catalyst of Comparative Example 4, except that platinum nitrate was replaced by palladium nitrate. The washcoat loading in the catalyst after calcination was 1.53 g/in$^3$, including 1.40 g/in$^3$ of Mn-alumina, 0.068 g/in$^3$ BaO and 112 g/ft$^3$ of Pd.

Example 4: Performance Evaluation of the Catalysts of Example 3 and of Comparative Examples 4, 5 and 6—CO, NO and HC Conversions All catalysts were aged together in one oven at 900° C. hydrothermally (10% O$_2$ and 10% steam) for 4 hours. Oven aging was done in an oven equipped with several gas lines for simultaneous dosage of several gases under controlled flow conditions. All aged samples were evaluated individually, one at a time using a Gasoline System Simulator (GSS) reactor operated using the New European Drive Cycle (NEDC) test cycle implemented from a real vehicle in the Compressed Natural Gas (CNG) mode. The results are displayed in FIG. 2.

a) Example 3 vs Comparative Examples 4 and 5

As may be taken from FIG. 2, the catalyst of Example 3 exhibits a HC conversion of about 69.5%, a CO conversion of about 83% and a NO conversion of about 92% while the catalyst of Comparative Example 4 exhibits a lower HC conversion of 33% and CO and NO conversions like those of Example 3. Further, the catalysts of Example 3 exhibit improved HC, CO and NO conversions compared to the catalyst of Comparative Example 5. Example 4 demonstrates that the catalyst of the present invention comprising palladium and manganese permits to obtain improved catalytic activities compared to a catalyst comprising platinum with, or without, manganese. This shows that palladium is mandatory in such catalyst formulations. Thus, the catalyst of the present invention permits to obtain improved HC conversion, which is particularly important in Compressed Natural Gas (CNG) applications, while exhibiting great NO and CO conversions under aged conditions. Essentially, the catalyst of the present invention shows superior three-way conversion catalyst performance (HC, CO, NOx).

b) Example 3 vs Comparative Example 6

As may be taken from FIG. 2, the catalyst of Comparative Example 6 exhibits lower HC, NO and CO conversions compared to the catalyst of Example 3. Example 4 further demonstrates that the catalyst of the present invention comprising palladium and manganese permits obtain improved catalytic activities compared to a catalyst comprising palladium but no manganese. Thus, from said example, there is an indication that palladium and manganese have a synergistic effect on the catalytic activities of a catalyst for the treatment of exhaust gas with respect to HC, CO and NO oxidations.

Comparative Example 7: Preparation of a Three-Way Conversion Catalyst not According to the Present Invention (Free of Manganese)

First Coating

A calcined powder of Pd (70 weight-% of the total weight of palladium in the first coating after calcination) of an oxygen storage compound comprising Ce (30 weight-% calculated as CeO$_2$) and Zr (60 weight-% calculated as ZrO$_2$) and further comprising lanthanum and yttrium (5 weight-% each calculated as X$_2$O$_3$) was added slowly under stirring to a container already filled with distilled water, n-octanol (0.3 weight-% based on the weight of the first coating after calcination), barium nitrate and zirconium nitrate (previously stirred for 10 minutes). The obtained slurry was stirred for 10 minutes followed by a pH adjustment to 3.8 and had a solid content of 40 weight-%. The obtained slurry was wet-milled until the particles of the slurry has a Dv90, as determined in Reference Example 2, of 7 micrometers.

Similarly, a first calcined powder of Pd (30 weight-% of the total weight of palladium in the first coating after calcination) on alumina (Al$_2$O$_3$: about 98.7 weight-%, having a BET specific surface area of about 145 m$^2$/g, a Dv50 of 7.2 micrometers and a total pore volume of 0.537 ml/g) and a second calcined powder of Rh (100 weight-% of the total weight of rhodium in the first coating after calcination) on alumina (Al$_2$O$_3$: about 98.7 weight-%, having a BET specific surface area of about 145 m$^2$/g, a Dv50 of 7.2 micrometers and a total pore volume of 0.537 ml/g) were stirred into a container with distilled water, n-octanol (0.3 weight-% based on the weight of the first coating after calcination), barium nitrate and zirconium nitrate. The obtained slurry was milled until the particles of the slurry had a Dv90, as determined in Reference Example 2, of 15 micrometers. The pH of the aqueous phase of the slurry was controlled prior to and after milling and was adjusted to 3.8 using nitric acid when necessary. The amount of barium nitrate in each slurry was calculated such that the final loading of BaO in the first coating of the catalyst after calcination was 0.068 g/in$^3$ and the amount of zirconium nitrate in each slurry was calculated such that the final loading of ZrO$_2$ in the first coating of the catalyst was 0.021 g/in$^3$.

The two slurries were finally blended into a final slurry. The final slurry had a solid content of 38 weight-% and was stirred for 10 minutes. The final slurry was milled until the particles of the slurry had a Dv90, as determined in Reference Example 2, of 12 micrometers. The pH of the aqueous phase of the slurry was controlled and adjusted to 3.5 with nitric acid. The obtained slurry was disposed over the full length of an uncoated flow-through cordierite honeycomb substrate (diameter: 11.84 cm (4.66 inches)×length: 11.43 cm (4.5 inches), cylindrical shaped substrate with 600/$(2.54)^2$ cells per square centimeter and 0.1 millimeter (4 mil) wall thickness) using the coating method described in Reference Example 3. Afterwards, the coated substrate was dried at 140° C. in air for 30 minutes and was calcined at 590° C. in air for 2 hours. The first coating had a washcoat loading in the catalyst after calcination of 1.63 g/in$^3$, including 0.825 g/in$^3$ of alumina, 0.680 g/in$^3$ of ceria-zirconia, 0.068 g/in$^3$ of BaO, 0.021 g/in$^3$ of ZrO$_2$, 54 g/ft$^3$ of Pd and 10 g/ft$^3$ of Rh.

Second Coating

An alumina powder (Al$_2$O$_3$: about 100 weight-%, having a BET specific surface area of about 150 m$^2$/g, a Dv50 of 35 micrometers, a mean pore radius of 11 nm and a total pore volume of 0.9 ml/g) was impregnated with an aqueous mixture of deionized water and a palladium nitrate. The amount of alumina was calculated such that the alumina loading (in the second coating) in the catalyst after calcination was of 0.6 g/in$^3$. The frit of Pd (50 weight-% of the total weight of palladium in the second coating after calcination) on alumina (solid content: 65 weight-%) was calcined in a calciner at 590° C. for 2 hours (thermal fixation). Similarly, the remaining palladium (50 weight-% of the total weight of palladium in the second coating after calcination) was impregnated on an oxygen storage compound comprising Ce (30 weight-% calculated as CeO$_2$) and Zr (60 weight-% calculated as ZrO$_2$) and further comprising lanthanum and yttrium (5 weight-% each calculated as X$_2$O$_3$) and was calcined at 590° C. for 2 hours (thermally fixation).

The calcined Pd/ceria-zirconia was added slowly under stirring to a container already filled with distilled water, n-octanol (0.3 weight-% based on the weight of the first coating after calcination), and barium nitrate (previously stirred for 10 minutes). The obtained slurry was stirred for 10 minutes and had a solid content of 40 weight-%. After a pH adjustment to 3.8 with nitric acid, the obtained slurry was milled until the particles of the slurry had a Dv90, determined as defined in Reference Example 2, of 7 micrometers.

Similarly, the calcined Pd-alumina frit was added slowly to a container already filled with distilled water, n-octanol (0.3 weight-% based on the weight of the first coating after calcination), and barium nitrate (previously stirred for 10 minutes). After an initial pH adjustment with nitric acid to 3.8, the obtained slurry was milled until the particles of the slurry had a Dv90, determined as in Reference Example 2, of 15 micrometers with a final pH adjustment to 3.8 using nitric acid if necessary. The amount of barium nitrate in each slurry was calculated such that the final loading of BaO in the second coating of the catalyst after calcination was 0.12 g/in$^3$. The two slurries were finally blended into a final slurry. The final slurry was stirred for 10 minutes and had a solid content of 38 weight-%. The final slurry was milled until the particles of the slurry had a Dv90, determined as in Reference Example 2, of 12 micrometers. The pH of the aqueous phase of the slurry was controlled and adjusted to 3.5 using nitric acid. The obtained slurry was disposed over the full length of the substrate coated with the first coating using the coating method described in Reference Example 3. Afterwards, the coated substrate was dried at 140° C. in air for 30 minutes and was calcined at 590° C. in air for 2 hours. The second coating had a washcoat loading in the catalyst after calcination of 1.55 g/in$^3$, including 0.8 g/in$^3$ of ceria-zirconia, 0.6 g/in$^3$ of alumina, 0.12 g/in$^3$ of BaO and 54 g/ft$^3$ of Pd. The obtained catalyst after calcination had a total platinum group metal loading of 118 g/ft$^3$, including 108 g/ft$^3$ of Pd and 10 g/ft$^3$ of Rh. The total washcoat loading of the catalyst after calcination was about 3.2 g/in$^3$.

Example 5: Preparation of a Three-Way Conversion Catalyst (5 weight-% of MnO$_2$)

First Coating

This coating was prepared and coated as the first coating of Comparative Example 7. The first coating had a washcoat loading in the catalyst after calcination of 1.63 g/in$^3$, including 0.825 g/in$^3$ of alumina, 0.680 of ceria-zirconia, 0.068 g/in$^3$ of BaO, 0.021 of ZrO$_2$, 54 g/ft$^3$ of Pd and 10 g/ft$^3$ of Rh.

Second Coating

The second coating was prepared as the second coating of Comparative Example 7, except that the alumina powder from Pd on alumina was replaced by an Mn-alumina powder (95 weight-% of Al$_2$O$_3$, 5 weight-% of MnO$_2$ having a BET specific surface area of about 132 m$^2$/g, a Dv50 of 37.5 micrometers, a mean pore radius of 11.2 nm and a total pore volume of 0.8 ml/g). The obtained slurry was disposed over the full length of the substrate coated with the first coating using the coating method described in Reference Example 3. Afterwards, the coated substrate was dried at 140° C. in air for 30 minutes and was calcined at 590° C. in air for 2 hours. The second coating had a washcoat loading in the catalyst after calcination of 1.55 g/in$^3$, including 0.8 g/in$^3$ of ceria-zirconia, 0.6 g/in$^3$ of Mn-alumina, 0.12 g/in$^3$ of BaO and 54 g/ft$^3$ of Pd. The obtained catalyst after calcination had a total platinum group metal loading of 118 g/ft$^3$, including 108 g/ft$^3$ of Pd and 10 g/ft$^3$ of Rh. The total washcoat loading of the catalyst after calcination was about 3.2 g/in$^3$.

Example 6: Preparation of a Three-Way Conversion Catalyst (8 Weight-% of MnO$_2$)

First Coating

This coating was prepared and coated as the first coating of Comparative Example 7. The first coating had a washcoat loading in the catalyst after calcination of 1.63 g/in$^3$, including 0.825 g/in$^3$ of alumina, 0.680 g/in$^3$ of ceria-zirconia, 0.068 g/in$^3$ of BaO, 0.021 g/in$^3$ of ZrO$_2$, 54 g/ft$^3$ of Pd and 10 g/ft$^3$ of Rh.

Second Coating

The second coating was prepared as the second coating of Example 5, except that the content of MnO$_2$ in the Mn-alumina powder was of 8 weight.-% based on the total weight of Mn-alumina). The obtained slurry was disposed over the full length of the substrate coated with the first coating using the coating method described in Reference Example 3. Afterwards, the coated substrate was dried at 140° C. in air for 30 minutes and was calcined at 590° C. in air for 2 hours. The second coating had a washcoat loading in the catalyst after calcination of 1.55 g/in$^3$, including 0.8 g/in³ of ceria-zirconia, 0.6 g/in³ of Mn-alumina, 0.12 g/in³ of BaO and 54 g/ft³ of Pd. The obtained catalyst after calcination had a total platinum group metal loading of 118 g/ft³, including 108 g/ft³ of Pd and 10 g/ft³ of Rh. The total washcoat loading of the catalyst after calcination was about 3.2 g/in³.

Example 7: Performance Evaluation of the Catalyst of Examples 5 and 6 and of Comparative Example 7—CO Conversion The catalysts of Examples 5 and 6 and of Comparative Example 7 were 100 h fuel-cut aged in with 850° C. inlet temperature according to ZDAKW ageing cycle. The performance of the aged catalysts was measured under world light duty test cycle (WLTC) on 1.4 l dual mode gasoline-CNG vehicle on a chassis-dyno in the CNG mode. The results are displayed on FIG. 3. As shown in FIG. 3, the WLTC results of aged (ZDAKW, 850° C., 100 hours, engine) catalysts indicate that the catalysts of Examples 5 and 6 are superior in CO conversion compared to the catalyst of Comparative Example 7 throughout the entire cycle, starting from the first acceleration. This observation is suggestive of an earlier light-off for the catalysts of Examples 5 and 6, respectively. Furthermore, the catalyst of Example 6 is seemingly more receptive to the catalyst of Example 5 during the high speed high flow segment of the cycle, with the latter slipping more CO, which indicates that more manganese is beneficial. HC and NOx conversion during the same cycle were also recorded for the aforementioned catalysts, with the results showing that all three formulations perform similarly.

CITED LITERATURE

Figure 1:
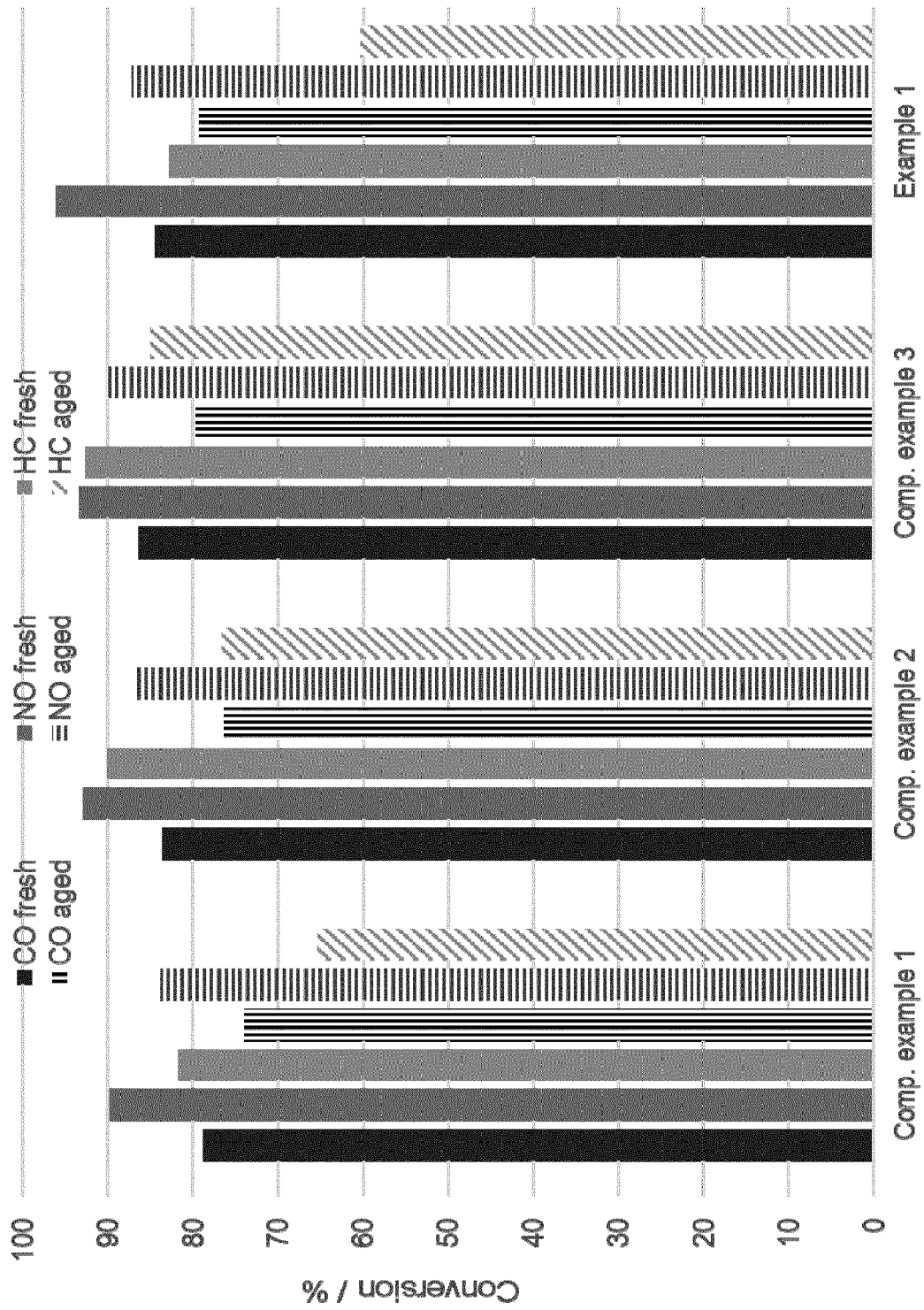
FIG. 1 shows the HC, CO and NO conversions obtained with the catalysts of Example 1 and of Comparative Examples 1-3, fresh and after oven-aging.
Figure 2:
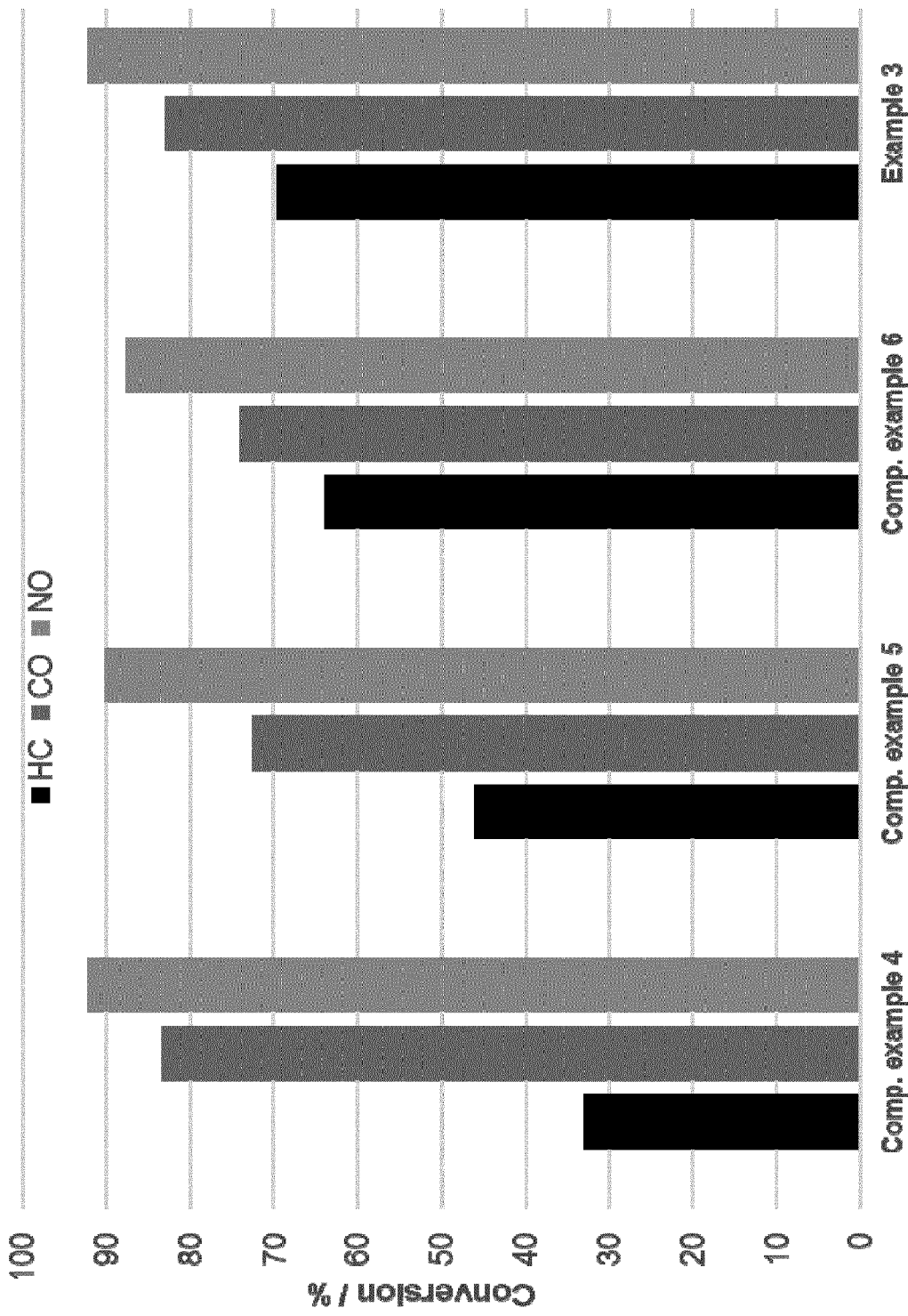
FIG. 2 shows the HC, CO and NO conversions obtained with the catalysts of Example 3 and of Comparative Examples 4-6 after oven-aging.
Figure 3:
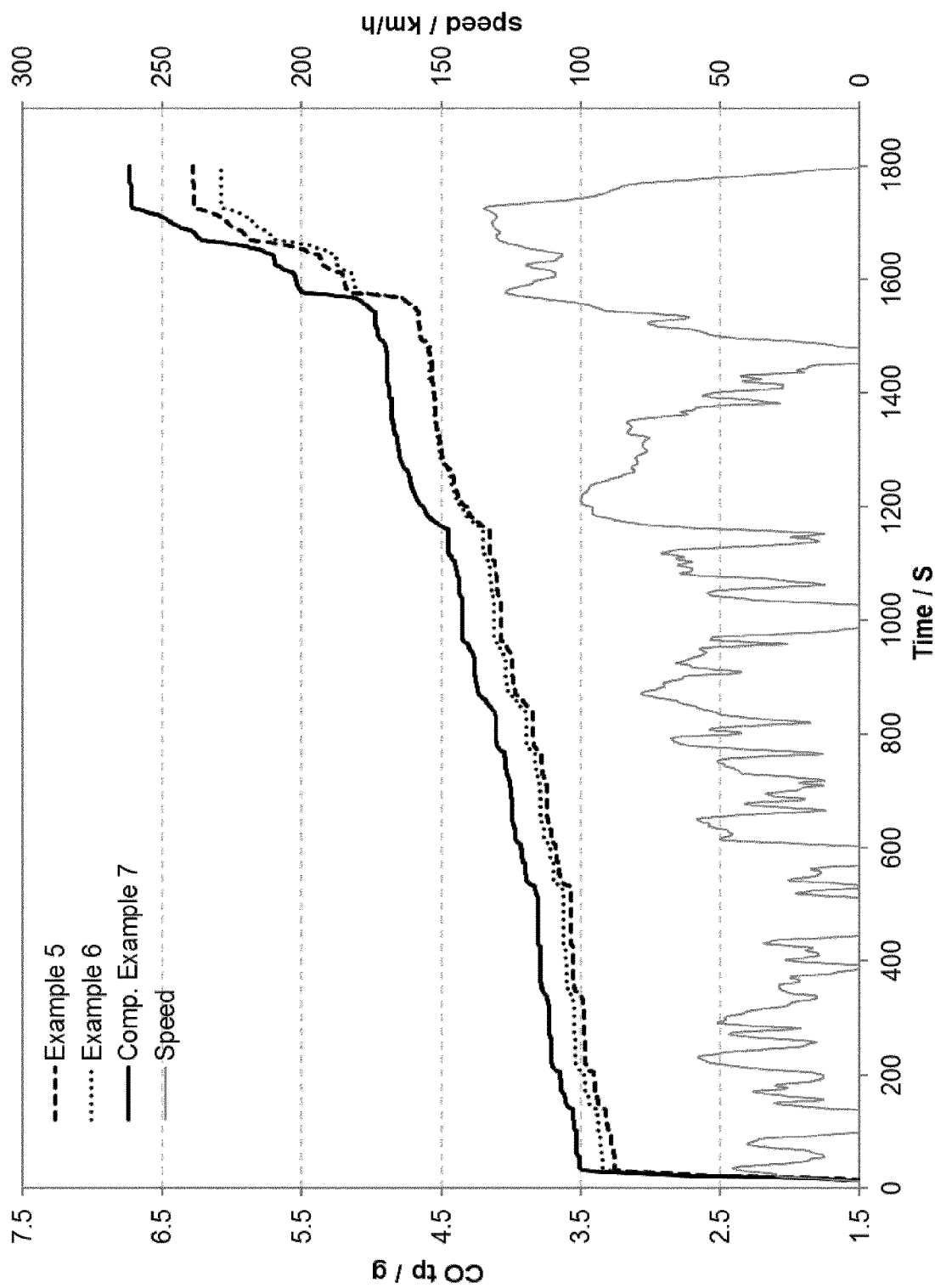
FIG. 3 shows the CO conversion obtained from the catalysts of Examples 5 and 6 and of Comparative Example 7, after engine-ageing.

WO 2015/09058A1
US2015/202572 A1
US2015/202600 A1
US2015/202611 A1

The invention claimed is:

1. A three-way conversion catalyst for the treatment of an exhaust gas comprising nitrogen monoxide, carbon monoxide and hydrocarbon, wherein the catalyst comprises:
   (i) a substrate comprising an inlet end, an outlet end, a substrate axial length extending from the inlet end to the outlet end and a plurality of passages defined by internal walls of the substrate extending therethrough;
   (ii) a first coating comprising rhodium supported on a first oxidic component; and
   (iii) a second coating comprising palladium supported on a non-zeolitic oxidic material, wherein the non-zeolitic oxidic material comprises manganese and a second oxidic component, wherein from 0 weight-% to 0.001 weight-% of the second coating consists of platinum;
   wherein the first coating is disposed on the surface of the internal walls of the substrate over x % of the substrate axial length and x ranging from 80 to 100;
   wherein the second coating extends over y % of the substrate axial length from the inlet end to the outlet end and is disposed on the first coating and y ranging from 20 to x.

2. The three-way conversion catalyst of claim 1, wherein x ranges from 90 to 100 and wherein y ranges from 80 to x.

3. The three-way conversion catalyst of claim 1, wherein the first oxidic component, in the first coating, is chosen from alumina, ceria, silica, zirconia, titania, a mixture of two or more thereof, and a mixed oxide of two or more thereof.

4. The three-way conversion catalyst of claim 1, wherein the first coating further comprises a platinum group metal other than rhodium.

5. The three-way conversion catalyst of claim 4, wherein the platinum group metal other than rhodium is supported on a third oxidic component.

6. The three-way conversion catalyst of claim 5, wherein the platinum group metal other than rhodium is further supported on a first oxygen storage compound.

7. The three-way conversion catalyst of claim 1, wherein the first coating consists of from 0 weight-% to 0.001 weight-% of manganese.

8. The three-way conversion catalyst of claim 1, wherein the second coating comprises manganese an amount ranging from 1 weight-% to 10 weight-%, calculated as $MnO_2$ and based on the weight of the non-zeolitic oxidic material.

9. The three-way conversion catalyst of claim 1, wherein the second oxidic component, in the non-zeolitic oxidic material of the second coating, is chosen from alumina, silica, ceria, zirconia, titania, a mixture of two or more thereof, and a mixed oxide of two or more thereof.

10. The three-way conversion catalyst of claim 1, wherein the second coating comprises palladium, calculated as elemental palladium, at a loading ranging from 20 g/ft³ to 200 g/ft³.

11. The three-way conversion catalyst of claim 1, wherein the second coating further comprises a second oxygen storage compound.

12. The three-way conversion catalyst of claim 1, wherein the substrate according to (i) is a flow-through substrate.

13. An exhaust gas treatment system downstream of and in fluid communication with an engine, the system comprising a three-way conversion catalyst according to claim 1.

14. A method of treating an exhaust gas comprising hydrocarbon, carbon monoxide, and nitrogen monoxide from a gasoline engine or a combined gasoline-natural gas engine comprising using the three-way conversion catalyst according to claim 1 for the treatment.

15. A process for preparing a three-way conversion catalyst comprising:
   (a) providing a substrate comprising an inlet end, an outlet end, a substrate axial length extending from the inlet end to the outlet end and a plurality of passages defined by internal walls of the substrate extending therethrough;
   (b) preparing a slurry comprising rhodium, a first oxidic component and water; disposing the slurry on the surface of the internal walls of the substrate over x % of the substrate axial length, from the inlet end to the outlet end of the substrate, or from the outlet end to the inlet end of the substrate, with x ranging from 80 to 100; calcining the obtained slurry-treated substrate, obtaining a substrate coated with a first coating;

(c) preparing a slurry comprising water, palladium and a non-zeolitic oxidic material, comprising manganese and a second oxidic component; disposing the slurry on the first coating of the coated substrate obtained in (b) over y % of the substrate axial length from the inlet end to the outlet end of the substrate, with y ranging from 20 to x; calcining the obtained slurry-treated substrate, obtaining a substrate coated with a first coating and a second coating, wherein the second coating consist of 0 weight-% to 0.001 weight-% of platinum.

* * * * *